(12) United States Patent  
Sharma et al.

(10) Patent No.: US 11,199,945 B2  
(45) Date of Patent: Dec. 14, 2021

(54) METHOD AND ELECTRONIC DEVICE FOR PERFORMING CONTEXT-BASED ACTIONS

(71) Applicant: Samsung Electronics Co., Ltd., Suwon-si (KR)

(72) Inventors: Ankur Sharma, Noida (IN); Anupriya Tewari, Noida (IN); Arpit Agrawal, Noida (IN); Pulkit Jain, Noida (IN); Shashi Singh, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 16/521,894

(22) Filed: Jul. 25, 2019

(65) Prior Publication Data

US 2020/0034009 A1 Jan. 30, 2020

(30) Foreign Application Priority Data

Jul. 25, 2018 (IN) .............................. 201841028010

(51) Int. Cl.
*G06F 3/0482* (2013.01)
*G06F 3/0486* (2013.01)
(Continued)

(52) U.S. Cl.
CPC .......... *G06F 3/0482* (2013.01); *G06F 3/0486* (2013.01); *G06F 3/04817* (2013.01); *G06T 11/00* (2013.01); *G06T 2200/24* (2013.01)

(58) Field of Classification Search
CPC .. G06F 3/0482; G06F 3/0486; G06F 3/04817; G06F 3/0488; G06T 11/00; G06T 2200/24

See application file for complete search history.

(56) References Cited

U.S. PATENT DOCUMENTS 9,104,302 B2   8/2015   Chai et al.
9,110,743 B2   8/2015   Messerly et al.
(Continued)

FOREIGN PATENT DOCUMENTS

KR        10-1423683 B1    7/2014
KR    10-2014-0118663 A   10/2014
(Continued)

OTHER PUBLICATIONS

Holly; Fewer Steps: Direct Share makes it even easier to share to your contacts in Android; https://www.androidcentral.com/using-direct-share-android; Dec. 16, 2015.
(Continued)

*Primary Examiner* — Phuong H Nguyen
(74) *Attorney, Agent, or Firm* — Jefferson IP Law, LLP

(57) ABSTRACT

A system and method for performing context-based actions in an electronic device is provided. The method includes selecting one or more first graphical objects in the electronic device, detecting a drag-and-drop event on the selected one or more first graphical objects involving manipulation of the one or more first graphical objects over one or more second graphical objects, and identifying a context associated with each of the one or more first graphical objects and the one or more second graphical objects in response to the detected drag-and-drop event, wherein the context of the one or more first graphical objects is shared with the one or more second graphical objects. Furthermore, the method includes performing one or more actions in the electronic device based on the identified context.

7 Claims, 31 Drawing Sheets

(51) Int. Cl.
*G06F 3/0481* (2013.01)
*G06T 11/00* (2006.01)

(56) References Cited

U.S. PATENT DOCUMENTS

| | | | |
|---|---|---|---|
| 9,952,681 B2 | 4/2018 | Bae et al. | |
| 2013/0178241 A1 | 7/2013 | Duggirala et al. | |
| 2013/0326415 A1 | 12/2013 | Park | |
| 2014/0365919 A1 | 12/2014 | Shaw et al. | |
| 2015/0356949 A1 | 12/2015 | Kim | |
| 2015/0365306 A1* | 12/2015 | Chaudhri | G06F 3/0484 715/736 |
| 2016/0132205 A1* | 5/2016 | Ramakrishnan | G06F 3/0488 715/765 |
| 2016/0217617 A1* | 7/2016 | Barribeau | G06F 3/04883 |
| 2018/0152555 A1 | 5/2018 | Chu et al. | |
| 2019/0163339 A1* | 5/2019 | Zhu | G06F 40/166 |

FOREIGN PATENT DOCUMENTS

| | | |
|---|---|---|
| KR | 10-2015-0083743 A | 7/2015 |
| KR | 10-2015-0141313 A | 12/2015 |
| KR | 10-1586688 B1 | 1/2016 |
| KR | 10-2017-0115863 A | 10/2017 |

OTHER PUBLICATIONS

@edent; Terence Edens's Blog: Sharing on Android is Broken; https://shkspr.mobi/blog/2015/08/sharing-on-android-is-broken/; Aug. 24, 2015.
International Search Report with Written Opinion dated Oct. 31, 2019; International Appln. No. PCT/KR2019/009276.
Indian Office Action dated Dec. 27, 2020, issued in a counterpart an Indian Application No. 201841028010.

* cited by examiner

METHOD AND ELECTRONIC DEVICE FOR PERFORMING CONTEXT-BASED ACTIONS

CROSS-REFERENCE TO RELATED APPLICATION(S)

This application is based on and claims priority under 35 U.S.C. § 119(a) of an Indian patent application number 201841028010, filed on Jul. 25, 2018, in the Indian Patent Office, the disclosure of which is incorporated by reference herein in its entirety.

BACKGROUND

1. Field

The disclosure relates to electronic devices. More particularly, the disclosure relates to a method and electronic device for performing context-based actions.

2. Description of Related Art

In general, electronic devices dominate all aspects of modern life. Over a period of time, the manner in which the electronic devices display information on a user interface has become intelligent, efficient, spontaneous, and less obtrusive. A user of an electronic device may often wish to share some interesting contents with his or her contacts while communicating through electronic devices. To facilitate content sharing, many applications may implement a function of content sharing.

In some existing methods, the content sharing is performed through a series of operations as described herein. The user opens a page in an application, and selects a content to be shared. Further, the user clicks a sharing button on a menu, and a sharing page corresponding to the page is displayed which guides the user to edit content to be shared in the sharing page, after a signal of the user clicking the sharing button is received by the electronic device. Finally, the content to be shared in the sharing page is sent to a server to share the content by the server.

As the application has more and more functions, it carries more and more application buttons accordingly. Therefore, to share the content, the user needs to perform several operations which finally results in a longer time and may be cumbersome to the user.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide a method for performing context-based actions in an electronic device.

Another aspect of the disclosure is to provide a method for selecting one or more first graphical objects in the electronic device.

Another aspect of the disclosure is to provide a method for detecting a drag-and-drop event on the selected one or more first graphical objects involving manipulation of the one or more first graphical objects to be positioned over one or more second graphical objects.

Another aspect of the disclosure is to provide a method for identifying a context associated with each of the one or more first graphical objects and the one or more second graphical objects in response to the detected drag-and-drop event.

Another aspect of the disclosure is to provide a method for sharing the context of the one or more first graphical objects with the one or more second graphical objects.

Another aspect of the disclosure is to provide a method for performing one or more actions in the electronic device based on the identified context.

In accordance with another aspect of the disclosure, a method for performing context-based actions in an electronic device is provided. The method includes selecting one or more first graphical objects in the electronic device, detecting a drag-and-drop event on the selected one or more first graphical objects involving manipulation of the one or more first graphical objects to be positioned over one or more second graphical objects, identifying a context associated with each of the one or more first graphical objects and the one or more second graphical objects in response to the detected drag-and-drop event, wherein the context of the one or more first graphical objects is shared with the one or more second graphical objects, and performing one or more actions in the electronic device based on the identified context.

In accordance with another aspect of the disclosure, a method for performing context-based actions in an electronic device is provided. The method includes selecting one or more first graphical objects in the electronic device, detecting a drag event on the selected one or more first graphical objects involving manipulation of the one or more first graphical objects, identifying a context associated with the one or more first graphical objects in response to the detected drag event, displaying one or more second graphical objects based on the identified context, and performing one or more actions in the electronic device based on the selection of the one or more second graphical objects.

In accordance with another aspect of the disclosure, a method for performing context-based actions in an electronic device is provided. The method includes selecting one or more first graphical objects representing one or more applications in the electronic device, detecting a drag-and-drop event on the selected one or more first graphical objects, identifying a type of content associated with the selected one or more first graphical objects, determining one or more second graphical objects for performing the one or more actions based on the identified type of content in response to detected drag-and-drop event, displaying the one or more second graphical objects, and performing the one or more actions in the electronic device based on the selection of the one or more second graphical objects.

In accordance with another aspect of the disclosure, an electronic device for performing context-based actions is provided. The electronic device includes a memory, at least one processor coupled to the memory and a contextual action engine coupled to the memory and the at least one processor. The contextual action engine is configured to select one or more first graphical objects in the electronic device, detect a drag-and-drop event on the selected one or more first graphical objects involving manipulation of the one or more first graphical objects to be positioned over one or more second graphical objects, and identify a context associated with each of the one or more first graphical objects and the one or more second graphical objects in response to the detected drag-and-drop event, wherein the context of the one or more first graphical objects is shared with the one or more second graphical objects. The contextual action engine is further configured to perform one or more actions in the electronic device based on the identified context.

In accordance with another aspect of the disclosure, an electronic device for performing context-based actions is provided. The electronic device includes a memory, at least one processor and a contextual action engine coupled to the memory and the at least one processor. The contextual action engine is configured to select one or more first graphical objects in the electronic device, detect a drag event on the selected one or more first graphical objects involving manipulation of the one or more first graphical objects, identify a context associated with the one or more first graphical in response to the detected drag event, display one or more second graphical objects based on the identified context, and perform one or more actions in the electronic device based on the selection of the one or more second graphical objects.

In accordance with another aspect of the disclosure, an electronic device for performing context-based actions is provided. The electronic device includes a memory, at least one processor and a contextual action engine coupled to the memory and the processor. The contextual action engine is configured to select one or more first graphical objects representing one or more applications in the electronic device, detect a drag-and-drop event on the selected one or more first graphical objects, identify a type of content associated with the selected one or more first graphical objects, determine one or more second graphical objects for performing the one or more actions based on the identified type of content in response to detected drag-and-drop event, display the one or more second graphical objects, and perform the one or more actions in the electronic device based on the selection of the one or more second graphical objects.

Other aspects, advantages, and salient features of the disclosure will become apparent to those skilled in the art from the following detailed description, which, taken in conjunction with the annexed drawings, discloses various embodiments of the disclosure.

Additional aspects will be set forth in part in the description which follows and in part, will be apparent from the description, or may be learned by practice of the presented embodiments.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
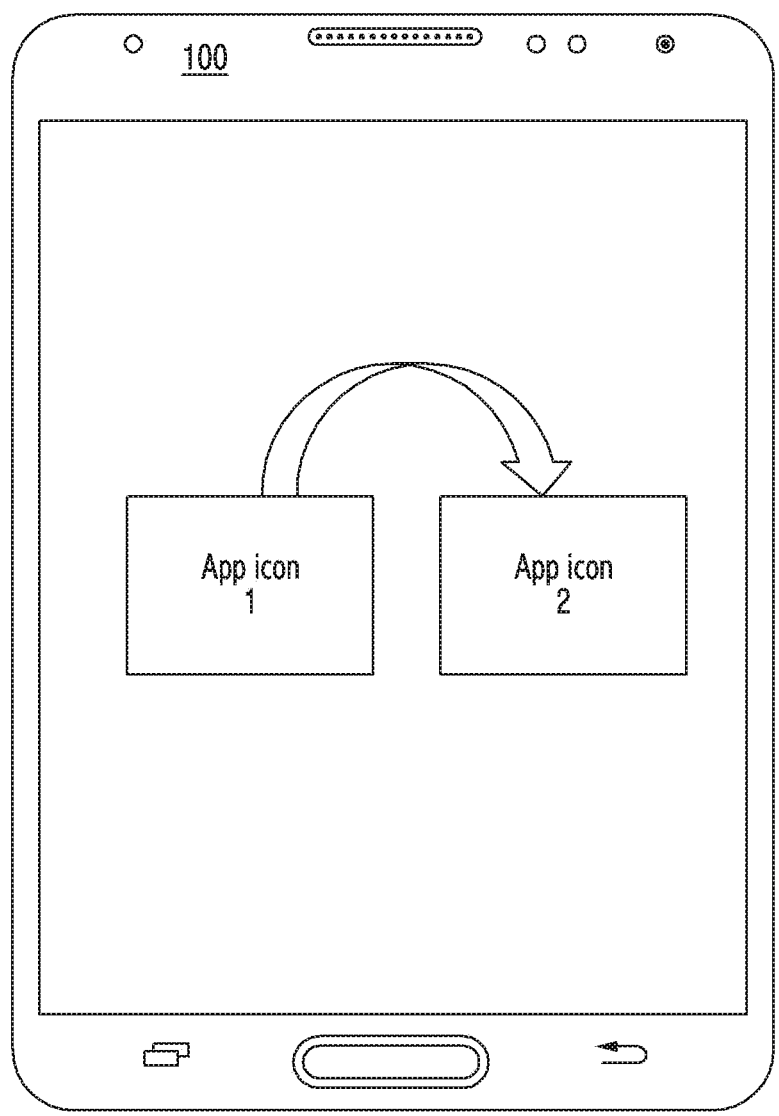
FIGS. 1A, 1B, and 1C are example illustrations in which an electronic device performs context-based actions, according to various embodiments of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "or" as used herein, refers to a non-exclusive or, unless otherwise indicated. The examples used herein are intended merely to facilitate an understanding of ways in which the embodiments can be practiced and to further enable those skilled in the art to practice the embodiments. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, managers, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Throughout the description, the term graphical objects refers to an application icon, a data item, a notification panel icon, a graphical user interface (GUI) element, a functional icon, a service icon, a button, or the like. The terms first graphical objects and second graphical objects are merely used for labeling purpose and shall not be construed to be limiting the scope of the embodiments of the disclosure.

Accordingly, the embodiments herein provide a method for performing context-based actions in an electronic device. The method includes selecting one or more first graphical objects in the electronic device. The method includes detecting a drag-and-drop event on the selected one or more first graphical objects involving manipulation of the one or more first graphical objects to be positioned over one or more second graphical objects. Further, the method includes identifying a context associated with each of the one or more first graphical objects and the one or more second graphical objects in response to the detected drag-and-drop event, wherein the context of the one or more first graphical objects is shared with the one or more second graphical objects. Furthermore, the method includes performing one or more actions in the electronic device based on the identified context.

For instance, consistent with one example embodiment, a user may press and hold his finger on a first graphical object displayed on the electronic device, such as a content or video window, while dragging, or otherwise moving his finger to "pull" the first graphical object and then lift his finger as if to "drop" the element on top of a second graphical object—such manipulation commonly referred to as a "drag-and-drop" operation. By dragging and dropping a first graphical object over the top of a second graphical object, the user can invoke a wide variety of operations that intuitively make sense to the user based on the context of graphical objects represent. For instance, in some example embodiments, dragging and dropping a content or video window over a graphical object representing a person, or group of people (such as the case may be with a buddy list) may automatically invoke an operation to share the content or video currently being displayed or presented in the content or video window of the content viewing application executing on the electronic device, with a particular person associated with the second graphical object.

In various embodiments, the method includes selecting one or more first graphical objects representing one or more applications in the electronic device. The method includes detecting a drag-and-drop event on the selected one or more first graphical objects. The method includes identifying a type of content associated with the selected one or more first graphical objects. The method includes determining one or more second graphical objects for performing the one or more actions based on the identified type of content in response to detected drag-and-drop event. Further, the method includes causing the display of the one or more second graphical objects. Further, the method includes performing the one or more actions in the electronic device based on the selection of the one or more second graphical objects.

The proposed method enables the user to perform the contextual action with a lesser number of operations to enhance the communication between applications. With the proposed method, the context of application icons, notification panel icons can be identified, which enables the electronic device to perform context-based actions by dragging and dropping the application icons over each other. Thus, the proposed method provides additional level of convenience to the user, where the user can perform various actions by dragging and dropping the application icons over each other. Various example illustrations in conjunction with the figures are provided for better understanding of the embodiments of the disclosure.

Figure 1B:
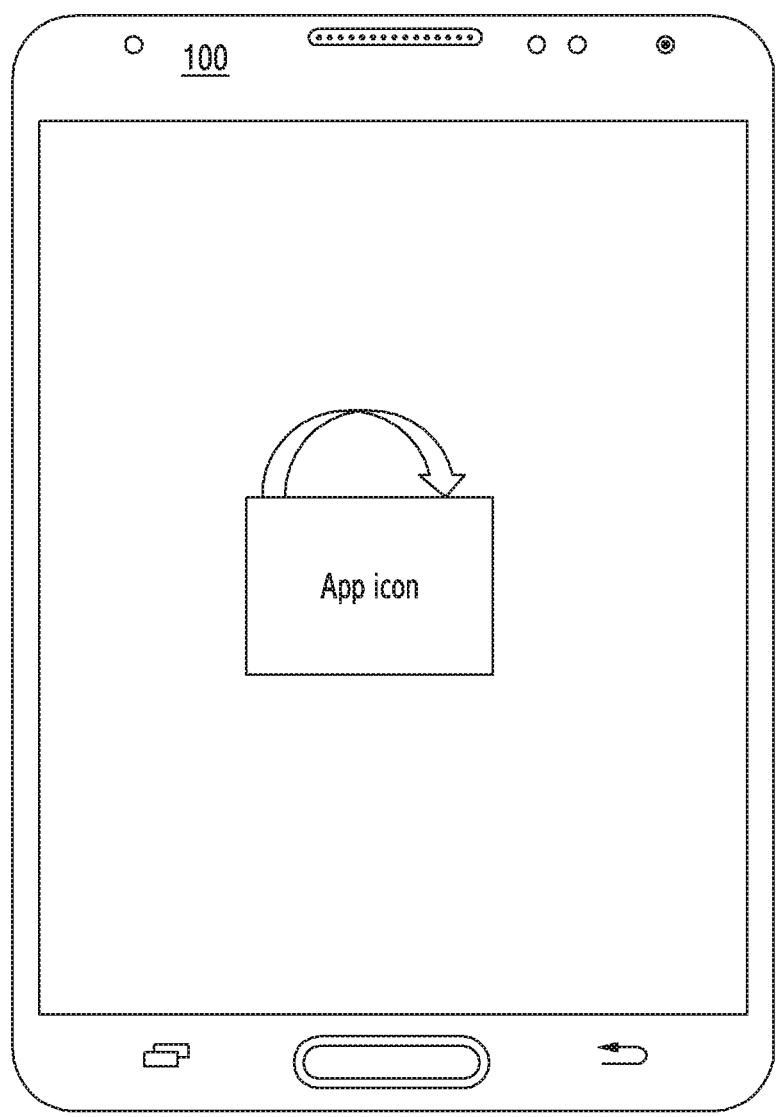
Figure 1C:
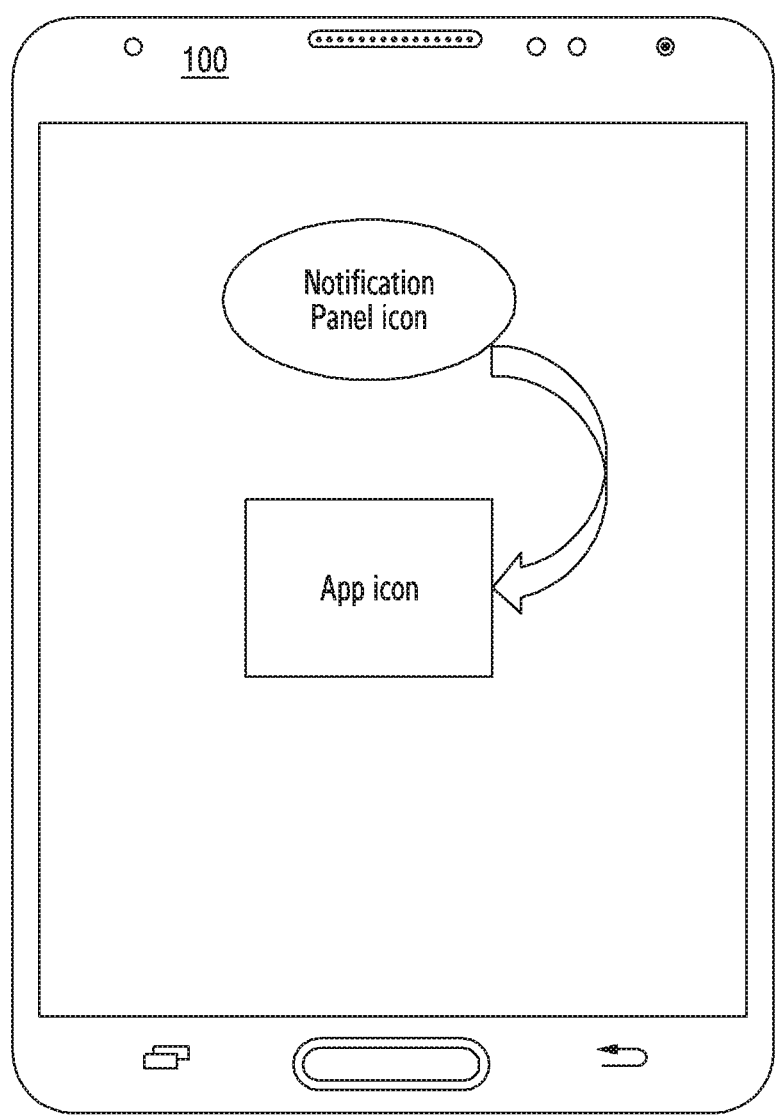

FIGS. 1A, 1B, and 1C are example illustrations in which an electronic device performs context-based actions, according to various embodiments of the disclosure. The electronic device can be, for example, but not limited to a cellular phone, a smart phone, a Personal Digital Assistant (PDA), a tablet computer, a laptop computer, a smart watch, a smart glass or the like.

Referring to FIG. 1A, in an embodiment, an application icon 1 of an electronic device 100 can be dragged and dropped on an application icon 2. The electronic device 100 performs one or more actions when the application icon 1 is dragged and dropped on the application icon 2 based on the context (i.e., current context) of the application icons 1 and 2. Based on the current context of the application icons (i.e., app icon 1 and app icon 2), actions are performed at the electronic device 100 when the drop operation is completed. The context of the application icon 1 is shared with the application icon 2 when the application icon 1 is dragged and dropped on the application icon 2 for enabling the electronic device 100 to perform context-based actions.

Referring to FIG. 1B, in another embodiment, an application icon can be dragged and dropped on itself. The electronic device 100 then performs one or more actions when the application icon 1 is dragged and dropped on itself based on the context of the application icon. The electronic device 100 provides one or more recommended actions to the user based on a current context of the application icon.

Referring to FIG. 1C, in yet another embodiment, a notification panel icon can be dragged and dropped on an application icon. The electronic device 100 then performs one or more actions when the notification icon is dragged and dropped on the application icon based on the context of the notification panel icon and application icon.

Thus, with the proposed method, the electronic device 100 performs actions based on the context of the application icons. Various actions performed by the electronic device 100 based on the context of the application icons are described in conjunction with figures.

Figure 2:
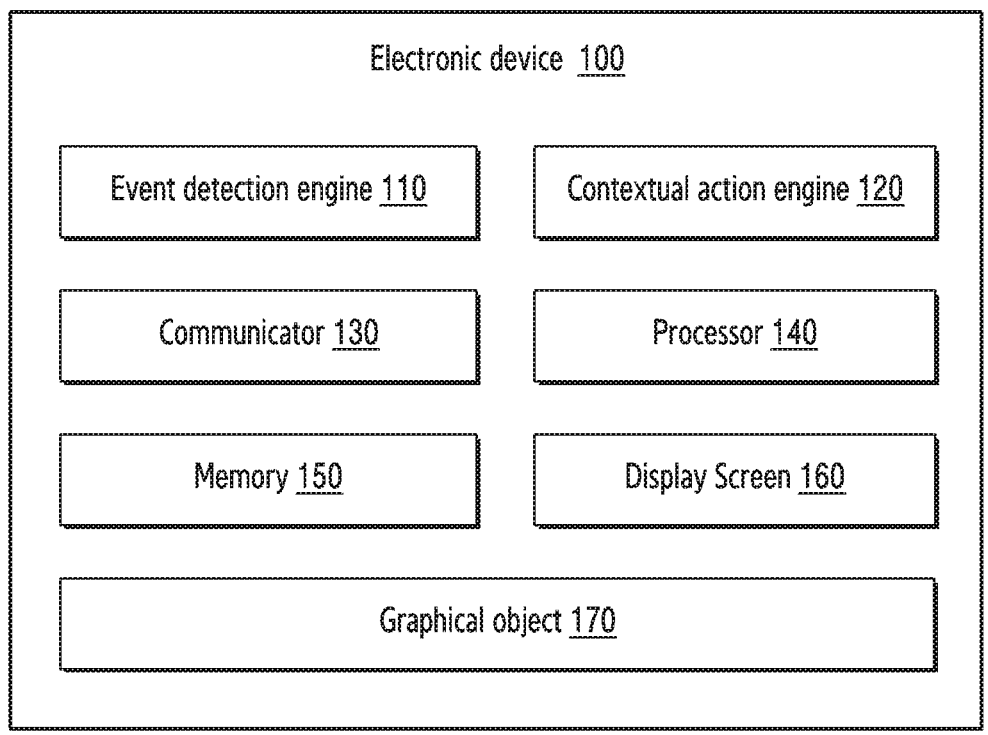
FIG. 2 is a block diagram of an electronic device, according to an embodiment of the disclosure.

FIG. 2 is a block diagram of an electronic device, according to an embodiment of the disclosure.

Referring to FIG. 2, the electronic device 100 includes an event detection engine 110, a contextual action engine 120, a communicator 130, a memory 150, at least one processor 140, a display screen 160 and graphical object(s) 170.

The event detection engine 110 can be configured to detect occurrences of a drag event, a drop event and a drag-and-drop event on the graphical object(s) 170.

The contextual action engine 120 can be configured to perform one or more actions based on the context of the application icons, notification panel icons, GUI elements or the like. The contextual action engine 120 can be can be configured to identify the current context of the application icons and performs one or more actions based on the identified context.

In an embodiment, the contextual action engine 120 can be can be configured to identify the current context of the application icons by extracting a recent activity of the user with the graphical objects 170 such as application icons, notification panel icons, GUI elements or the like. Thus, the contextual action engine 120 can be configured to perform various actions based on the identified context.

The communicator 130 is configured for communicating internally between internal hardware components and with external devices via one or more networks. The communicator 130 is configured for communicating with the contextual action engine 120 to perform context-based actions in the electronic device 100.

The processor 140 is coupled with the contextual action engine 120, the communicator 130, the memory 150, the display screen 160 and the graphical objects 170. The processor 140 is configured to execute instructions stored in the memory 150 and to perform various actions. The processor 140 being in communication with the contextual action engine 120 obtains the context of the application icons, notification panel icons or the like. When the user performs dragging and dropping of the application icon over another application icon, the contextual action engine 120 identifies the context the current context of the application icons and communicates the identified context of the application icons to the processor 140. Thus, the processor 140 obtains the context of the application icons (i.e., recent activity) and executes one or more instructions for enabling the electronic device 100 to perform context-based actions.

The memory 150 stores a mapping of content-Action and Action-Package Names. The memory 150 also stores instructions to be executed by the processor 140. The memory 150 may include volatile or non-volatile storage elements, or combinations thereof.

The various actions performed based on the identified context are displayed to the user on the display screen 160.

Although FIG. 2 shows various hardware components of the electronic device 100, it is to be understood that other embodiments are not limited thereto. In other embodiments, the electronic device 100 may include a less or greater number of components. Further, the labels or names of the components are used only for illustrative purpose and does not limit the scope of the disclosure. One or more components can be combined together to perform same or substantially similar functions to perform context-based actions in the electronic device 100.

Figure 3:
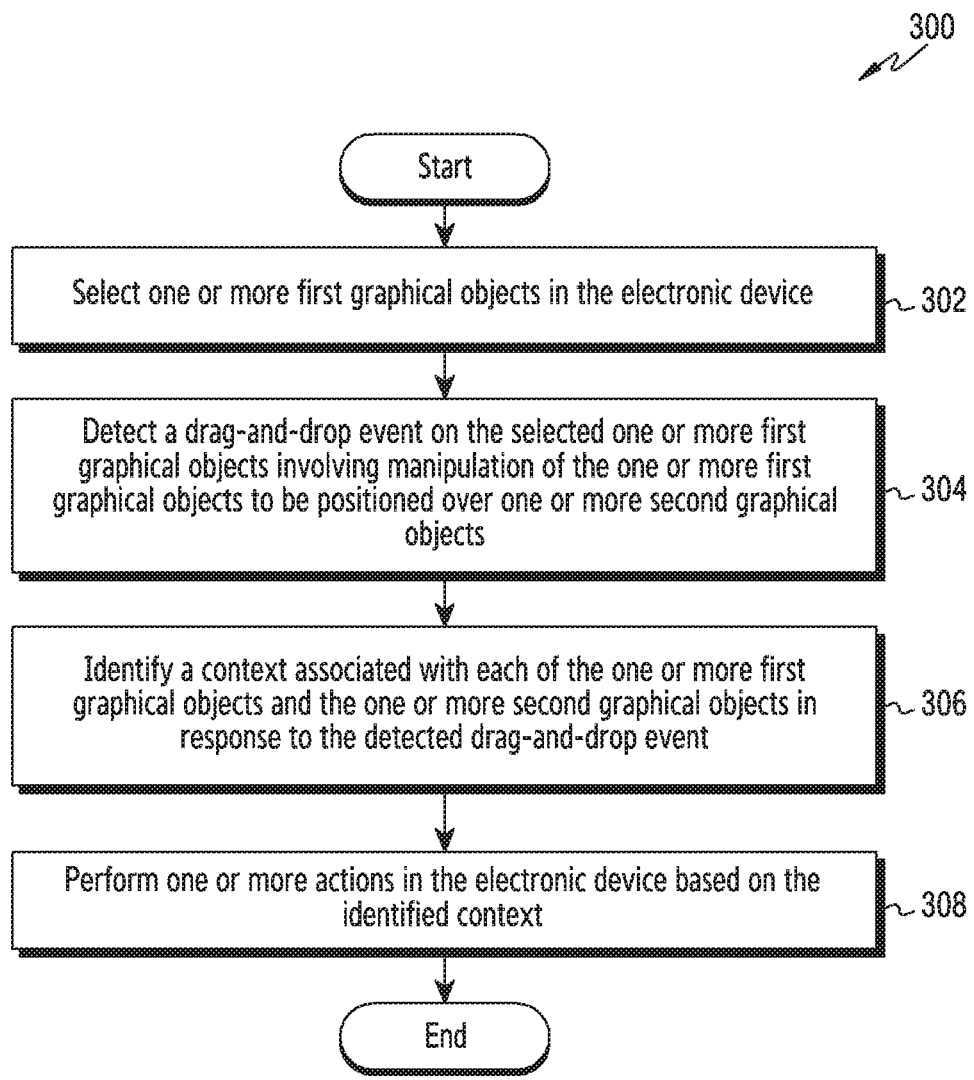
FIG. 3 is a flow chart illustrating a method for performing context-based actions in an electronic device, according to an embodiment of the disclosure.

FIG. 3 is a flow chart illustrating a method for performing context-based actions in an electronic device, according to an embodiment of the disclosure.

Referring to FIG. 3, at operation 302 of flow chart 300, the method includes selecting the one or more first graphical objects in the electronic device 100. At operation 304, the method includes detecting the drag-and-drop event on the selected one or more first graphical objects involving manipulation of the one or more first graphical objects to be positioned over one or more second graphical objects.

At operation 306, the method includes identifying the context associated with each of the one or more first graphical objects and the one or more second graphical objects in response to the detected drag-and-drop event. At operation 308, the method includes performing the one or more actions in the electronic device 100 based on the identified context.

The various actions, acts, blocks, operations, or the like in the flow chart 300 may be performed in the order presented, in a different order or simultaneously. Further, in some embodiments, some of the actions, acts, blocks, operations, or the like may be omitted, added, modified, skipped, or the like without departing from the scope of the disclosure.

Figure 4A:
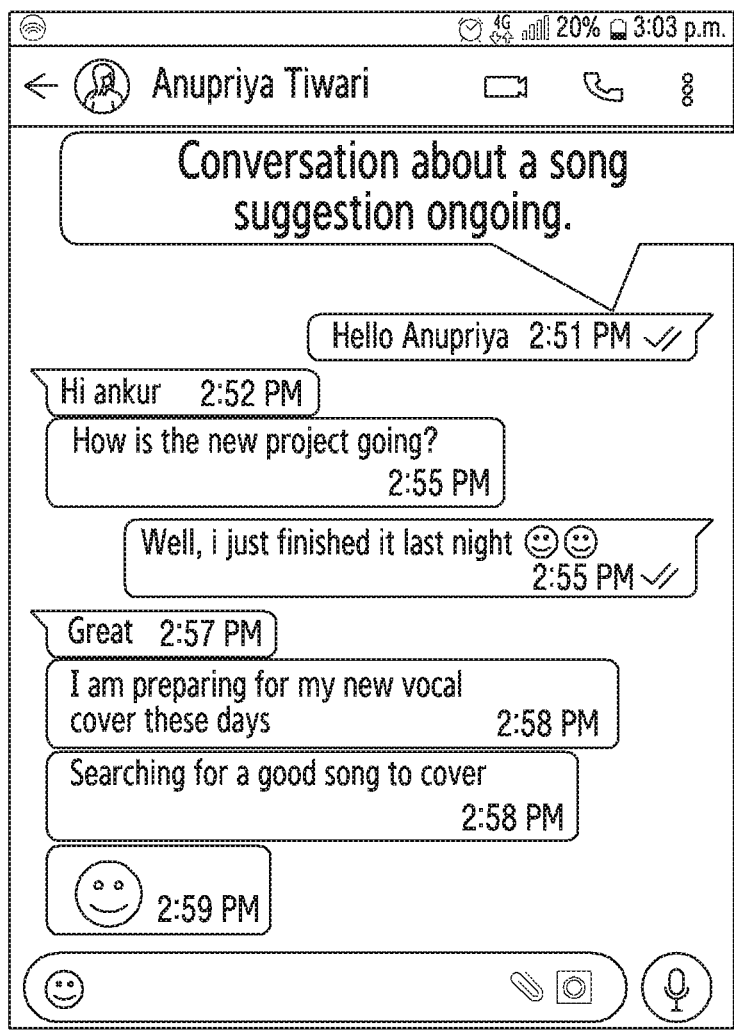
FIGS. 4A, 4B, 4C, 4D, 4E, and 4F are example illustrations for sharing content by dragging and dropping an application icon over another application icon, according to various embodiments of the disclosure.
Figures 4A, 4B:
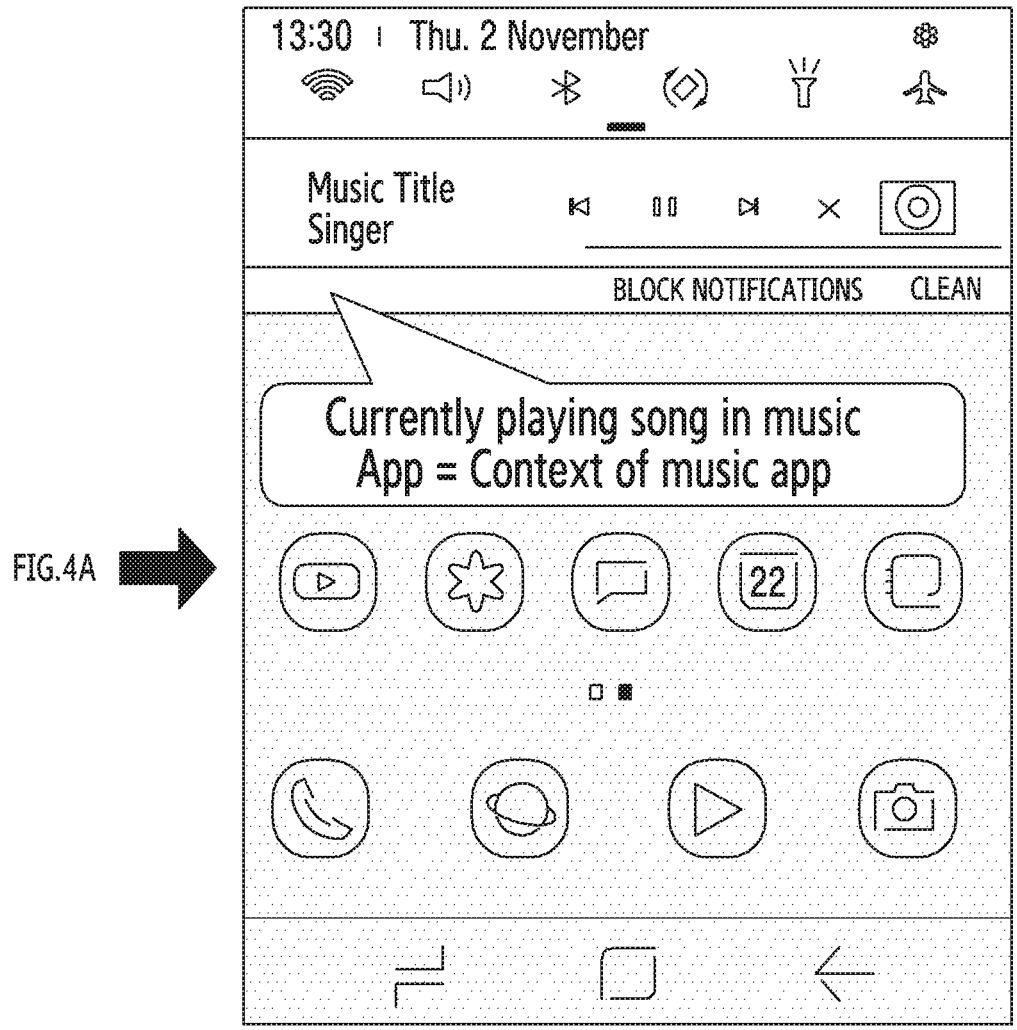
Figure 4C:
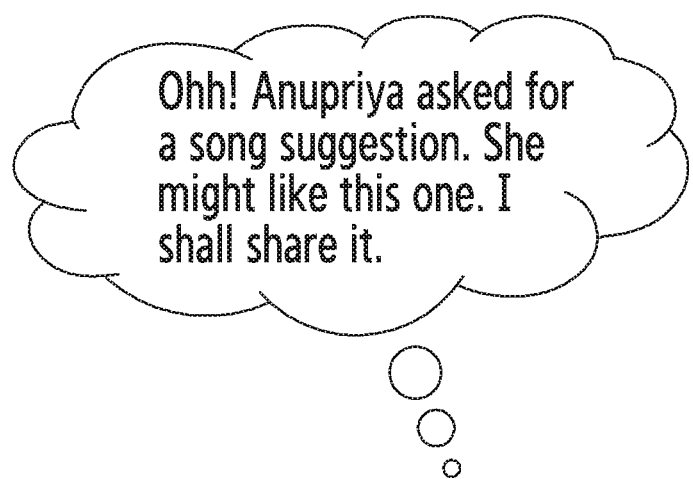
Figure 4C:
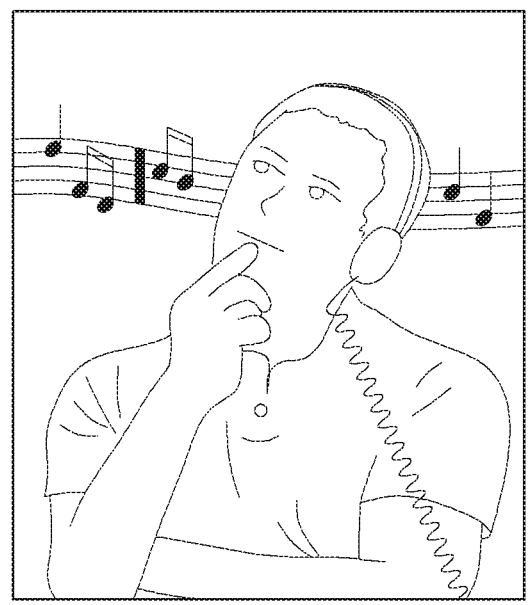
Figure 4D:
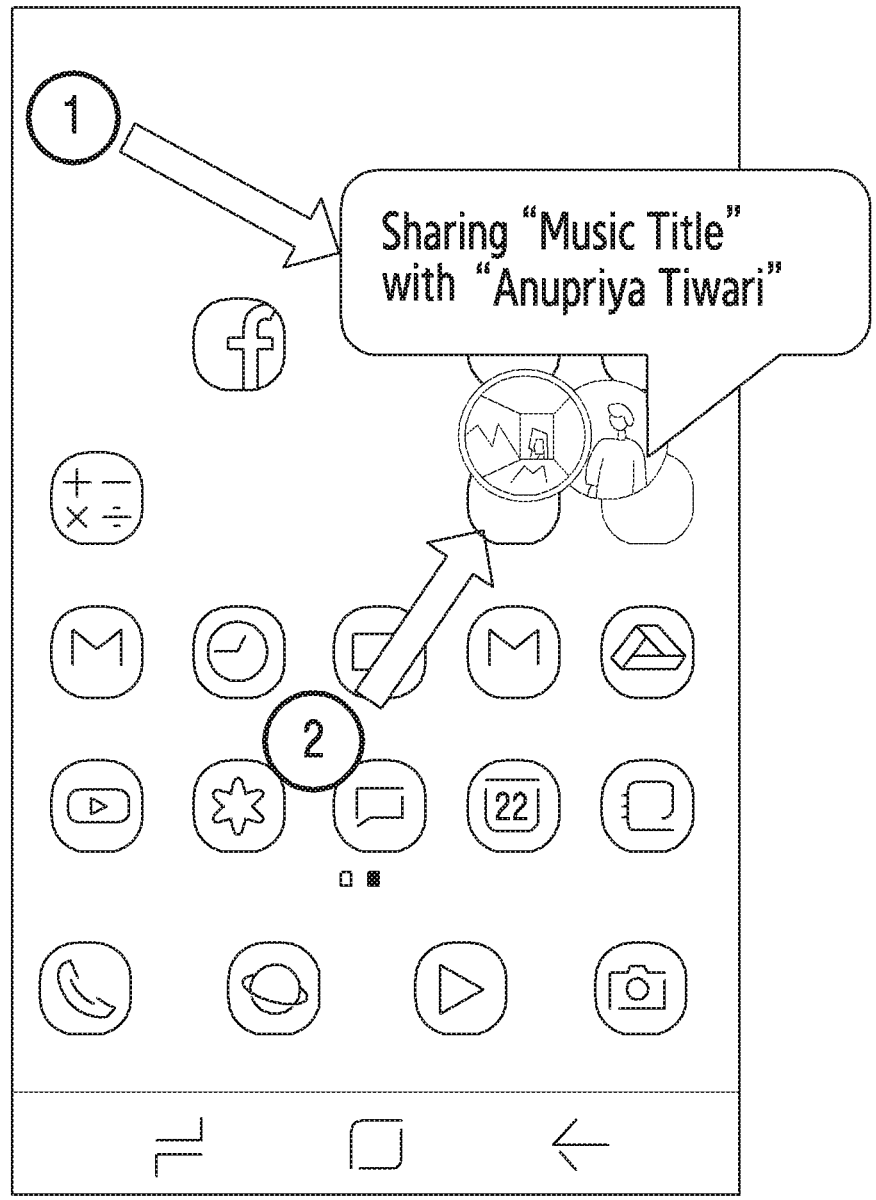

FIGS. 4A, 4B, 4C, 4D, 4E, and 4F are example illustrations for sharing content by dragging and dropping an application icon over another application icon, according to various embodiments of the disclosure. The various application icons shown in the FIGS. 4B and 4D are merely for illustration purpose in order to describe the embodiments.

Referring to FIG. 4A, a conversation about a song suggestion is ongoing in a chat application on the electronic device 100. Further, the user is currently playing a song in a music application on another electronic device 100 as shown in the FIG. 4B. The current context of the music application is the song being played in the music application and the context of the chat application is the last communicated message in a chat thread. While listening to the song, the user realizes that the song was requested during the conversation as shown in the FIG. 4C. Further, the user performs a drag-and-drop of the music application over the chat application as shown in the FIG. 4D on the electronic device 100.

When the user performs drag-and-drop of the music application over the chat application, the graphical elements are temporarily changed to represent the current context when they come in vicinity at the time of sharing as shown in the FIG. 4D. When the chat application icon comes in vicinity of the music icon, a notification is displayed to the user indicating that the song is being shared through the chat application as shown in the FIG. 4D.

Figure 4E:
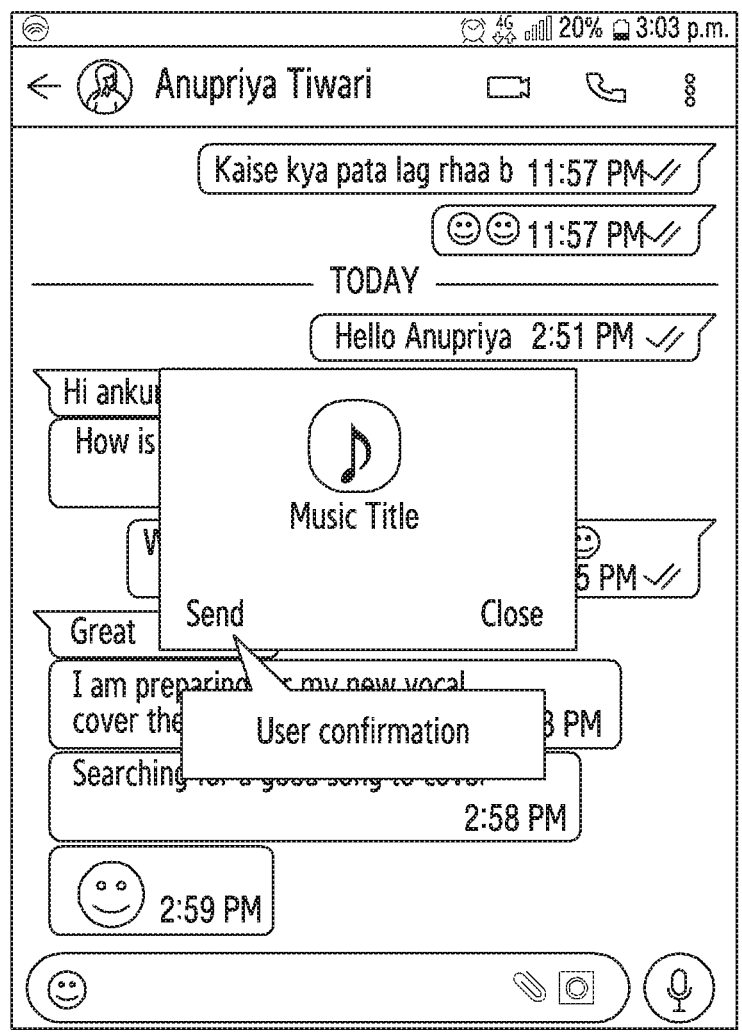
Figure 4F:
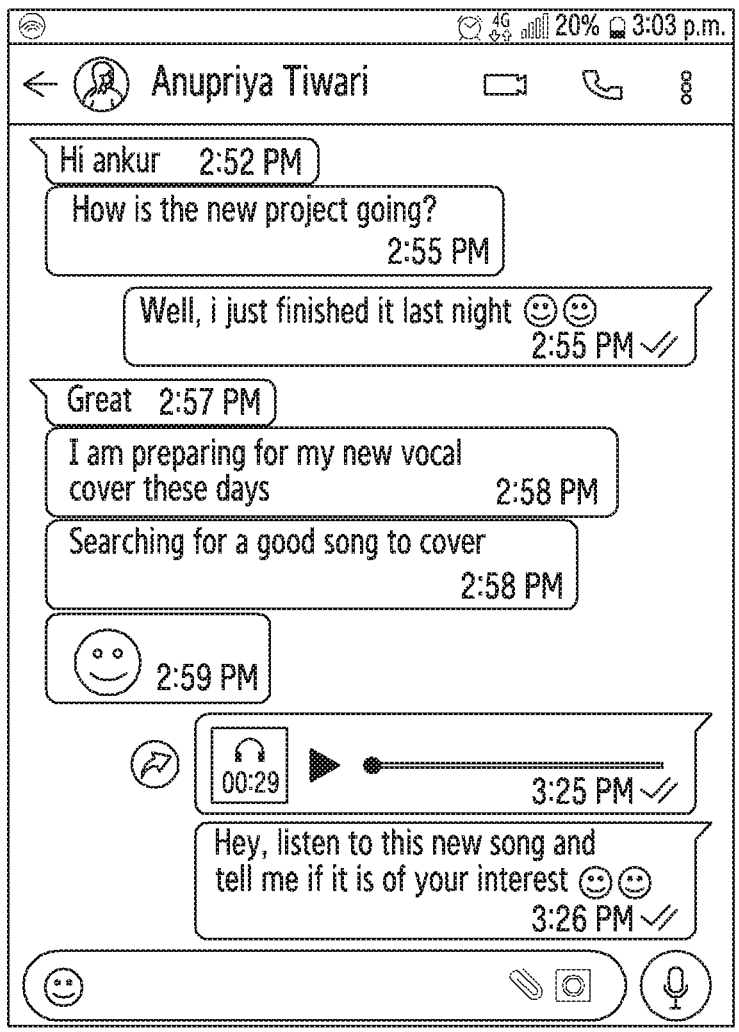

Further, the electronic device 100 displays a notification to the user for obtaining the user confirmation for sharing the song with the recipient (in the chat application) as shown in the FIG. 4E. When the user provides confirmation, the song is shared with the recipient as shown in the FIG. 4F.

Figure 5:
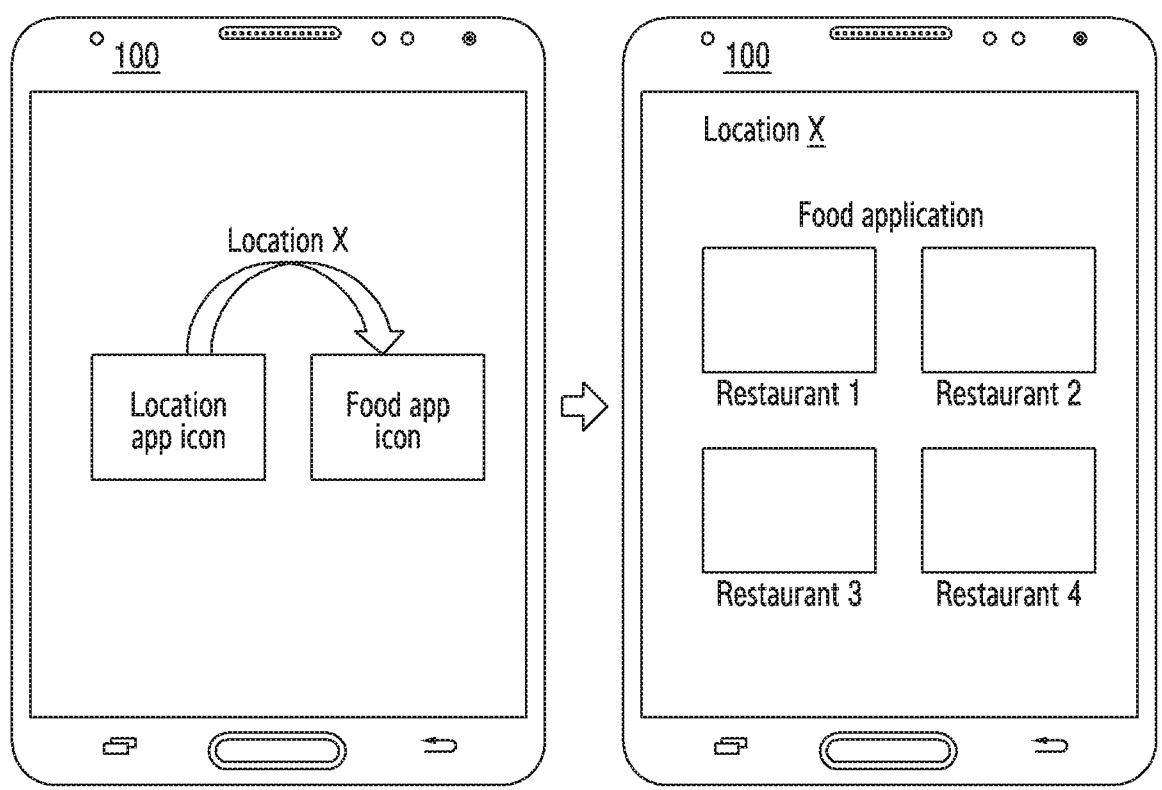
FIG. 5 is an example illustration in which an electronic device displays a plurality of restaurants based on a location, according to an embodiment of the disclosure.

FIG. 5 is an example illustration in which an electronic device displays a plurality of restaurants based on a location, according to an embodiment of the disclosure.

Referring to FIG. 5, a location application icon is dragged and dropped over a food application icon on the electronic device 100. When the location application is dragged and dropped over the food application icon, the current location (i.e., the context of the location icon) of the user is shared with the food application icon. With the current location of the user, the food application displays the plurality of restaurants in the vicinity of the user.

Figure 6:
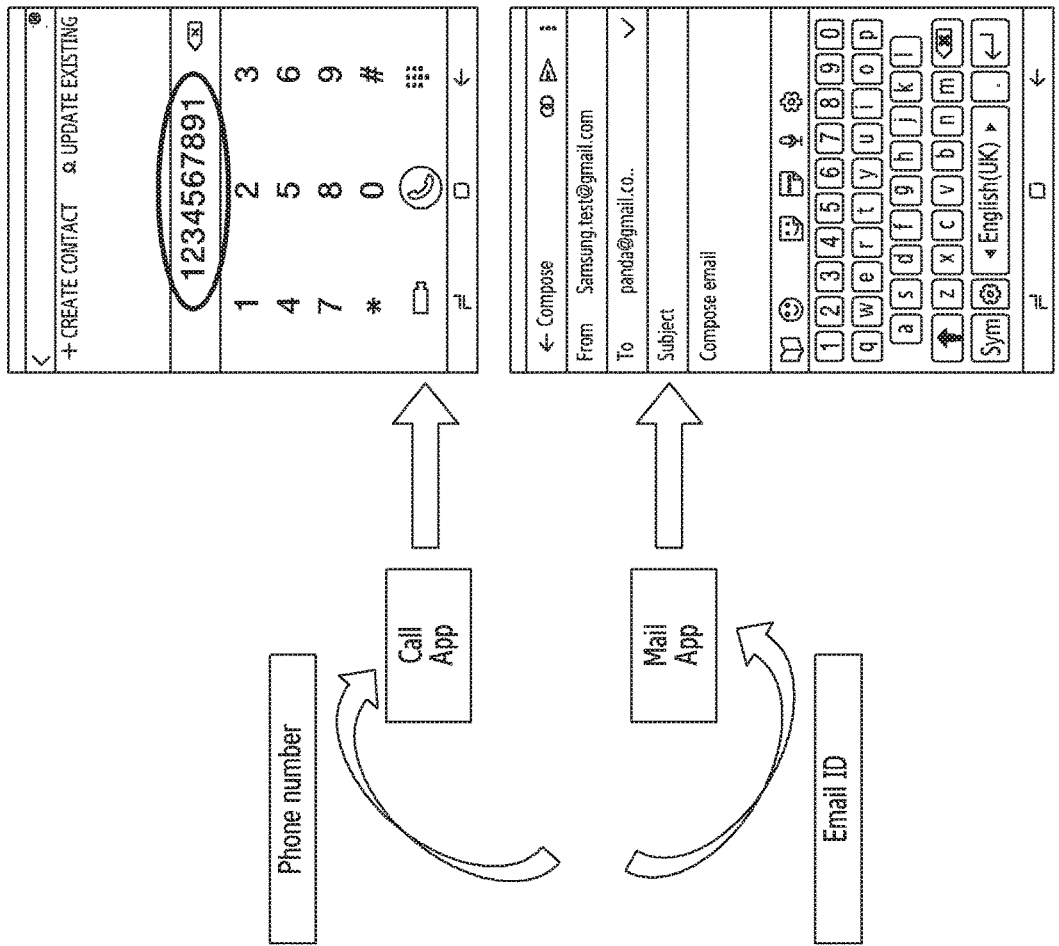
FIG. 6 is an example illustration in which an electronic device performs actions when an application icon is dragged and dropped over one or more application icons, according to an embodiment of the disclosure.

FIG. 6 is an example illustration in which an electronic device performs actions when an application icon is dragged and dropped over one or more application icons, according to an embodiment of the disclosure.

Referring to FIG. 6, the user is accessing a professional networking application and is searching for various profiles on the electronic device 100. The user can drag-and-drop the professional networking application icon on a call icon or an email icon. When the professional networking application icon is dragged and dropped on the call icon, the electronic device 100 launches a calling application with a mobile number of a profile being accessed by the user. Further, when the professional networking application icon is dragged and dropped on the email icon, an email application is launched with an email ID of the profile being accessed by the user as shown in the FIG. 6.

Figure 7:
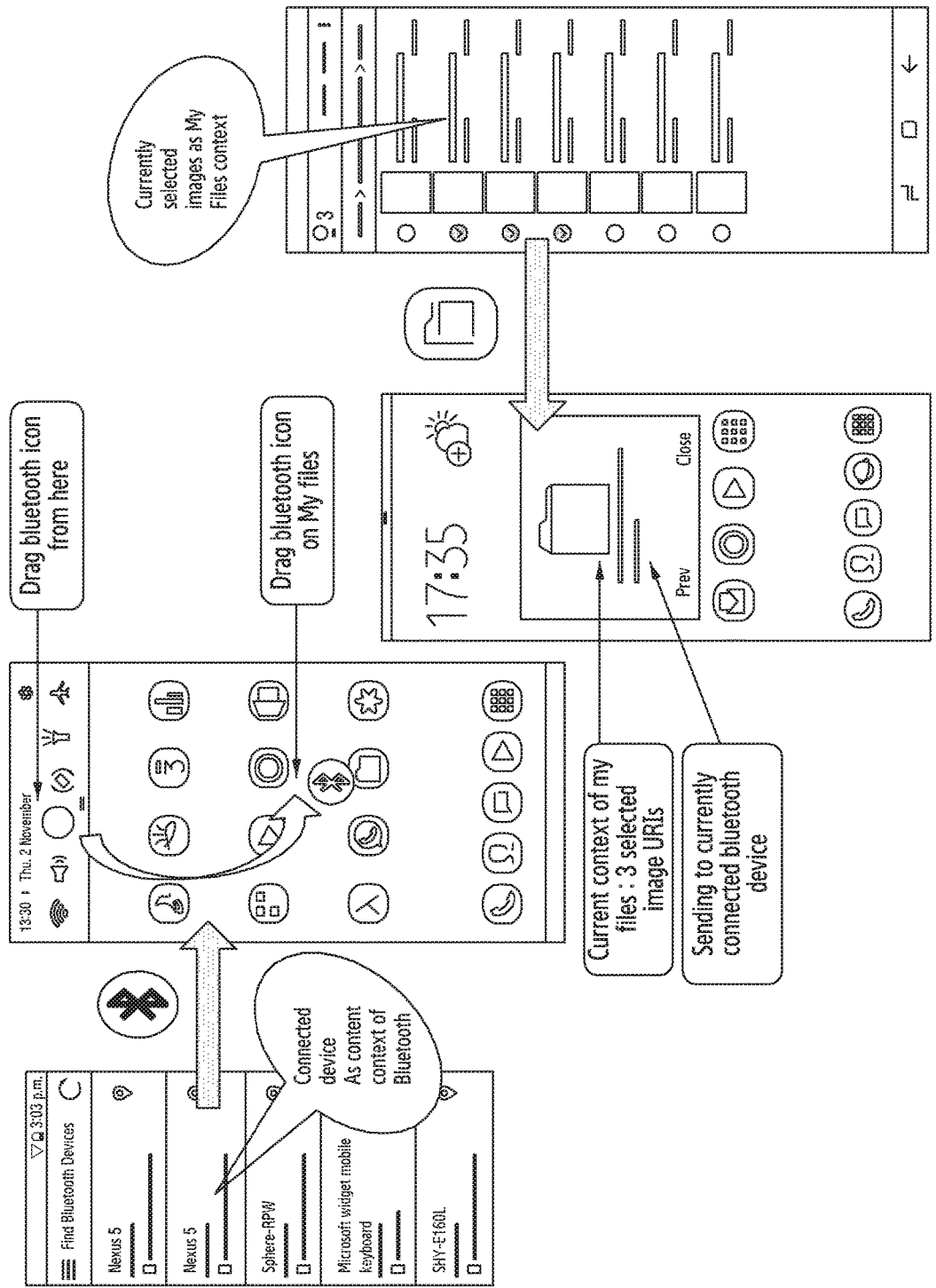
FIG. 7 is an example illustration for sharing content by dragging and dropping a notification panel icon over an application icon, according to an embodiment of the disclosure.

FIG. 7 is an example illustration for sharing content by dragging and dropping a notification panel icon over an application icon, according to an embodiment of the disclosure.

Referring to FIG. 7, a notification panel icon (i.e., a Bluetooth icon) can be dragged and dropped over "My files" icon. The current context of the Bluetooth icon includes a last connected device and the current context of the "My files" is the set of last selected images. When the Bluetooth icon is dragged and dropped over the My files icon, the images are shared with the last connected device through Bluetooth.

Figure 8A:
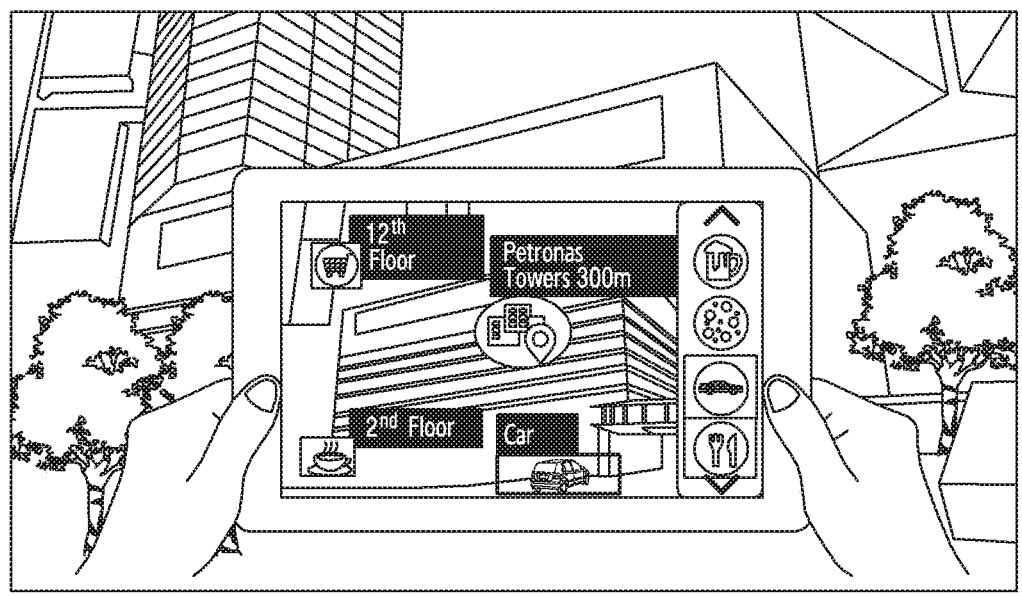
FIGS. 8A, 8B, and 8C are example illustrations in which an electronic device performs context-based actions with an Augmented Reality (AR) mode, according to various embodiments of the disclosure.
Figure 8B:
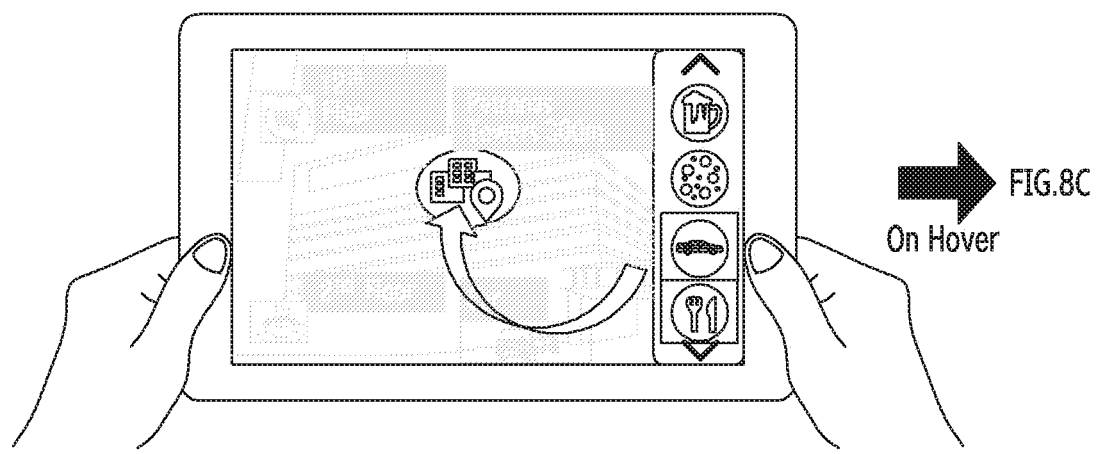
Figure 8C:
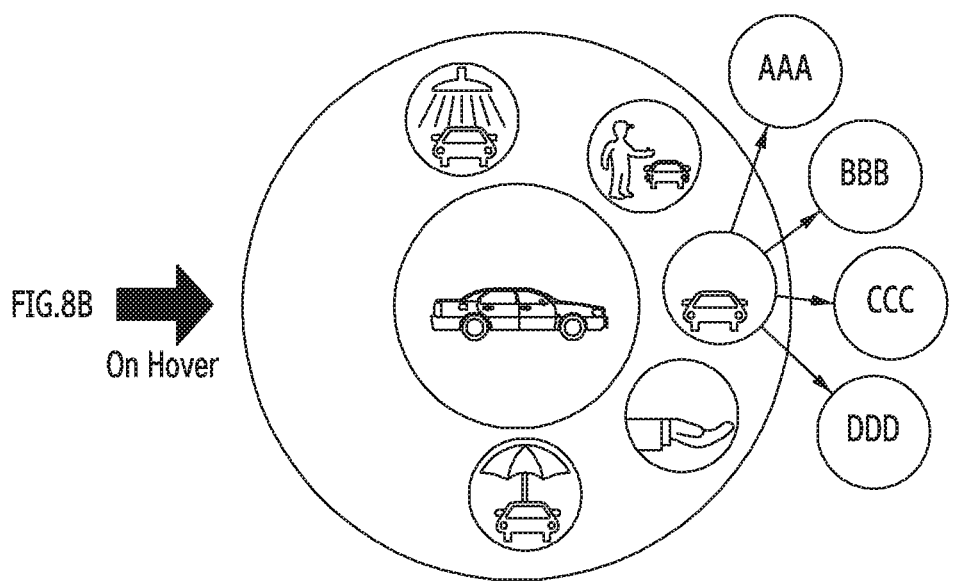

FIGS. 8A, 8B, and 8C are example illustrations in which an electronic device performs context-based actions with an Augmented Reality (AR) mode, according to various embodiments of the disclosure. The proposed method can be applied to an AR domain.

Referring to FIG. 8A, when the user points a camera of the electronic device 100 toward any surroundings, the user may obtain objects identified in the current frame along with pre-identified objects as "available contexts" on a slider bar. The pre-identified object icons can be dragged and dropped to any identified object on the current AR frame to perform context-based actions in the electronic device 100. As shown in the FIG. 8A, the AR identifies a "Car", "Petronas Towers" (Building) along with other objects in current frame. The user drags the car icon from slider bar and hovers on "Petronas Towers" icon as shown in the FIG. 8B. When the user drags the car icon and hovers on the "Petronas Towers" icon, electronic device 100 displays all possible actions related to a car that exist in the "Petronas Towers" building as shown in the FIG. 8C. The "Petronas Towers" has shops for car wash, car loan, car mechanic, car music system installation etc., which have registered themselves for "CAR" context. Further, then user can drop the car icon on any of these actionable icons. In this example, the user wants to install car music system. The drag-and-drop of the car icon provides the user with the available options in "Petronas Towers" building for this action.

In another example scenario, when the user performs a drag on a mail icon and drops the mail icon on a calendar icon, the context of the mail icon (i.e., a last received email) is extracted. If the last received email contains a meeting schedule, a calendar event for the meeting schedule is saved in the calendar icon.

Figure 9:
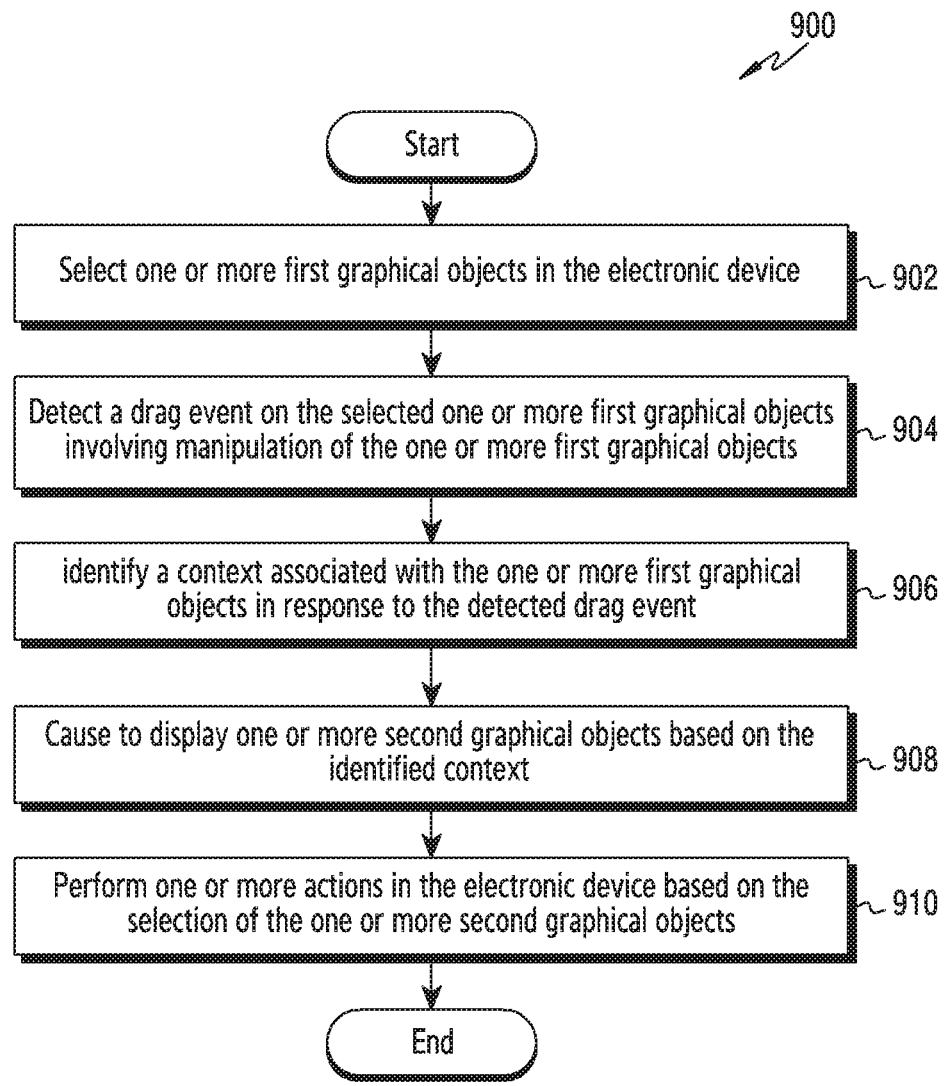
FIG. 9 is a flow chart illustrating a method for performing context-based actions in an electronic device based on a drag event on an application icon, according to an embodiment of the disclosure.

FIG. 9 is a flow chart illustrating a method for performing context-based actions in an electronic device based on a drag event on an application icon, according to an embodiment of the disclosure.

Referring to FIG. 9, at operation 902 of flow chart 900, the method includes selecting the one or more first graphical objects in the electronic device 100. At operation 904, the method includes detecting a drag event on the selected one or more first graphical objects involving manipulation of the one or more first graphical objects. At operation 906, the method includes identifying the context associated with the one or more first graphical objects in response to the detected drag event. At operation 908, the method includes causing to display the one or more second graphical objects based on the identified context. At operation 910, the method includes performing the one or more actions in the electronic device 100 based on the selection of the one or more second graphical objects.

Figure 10:
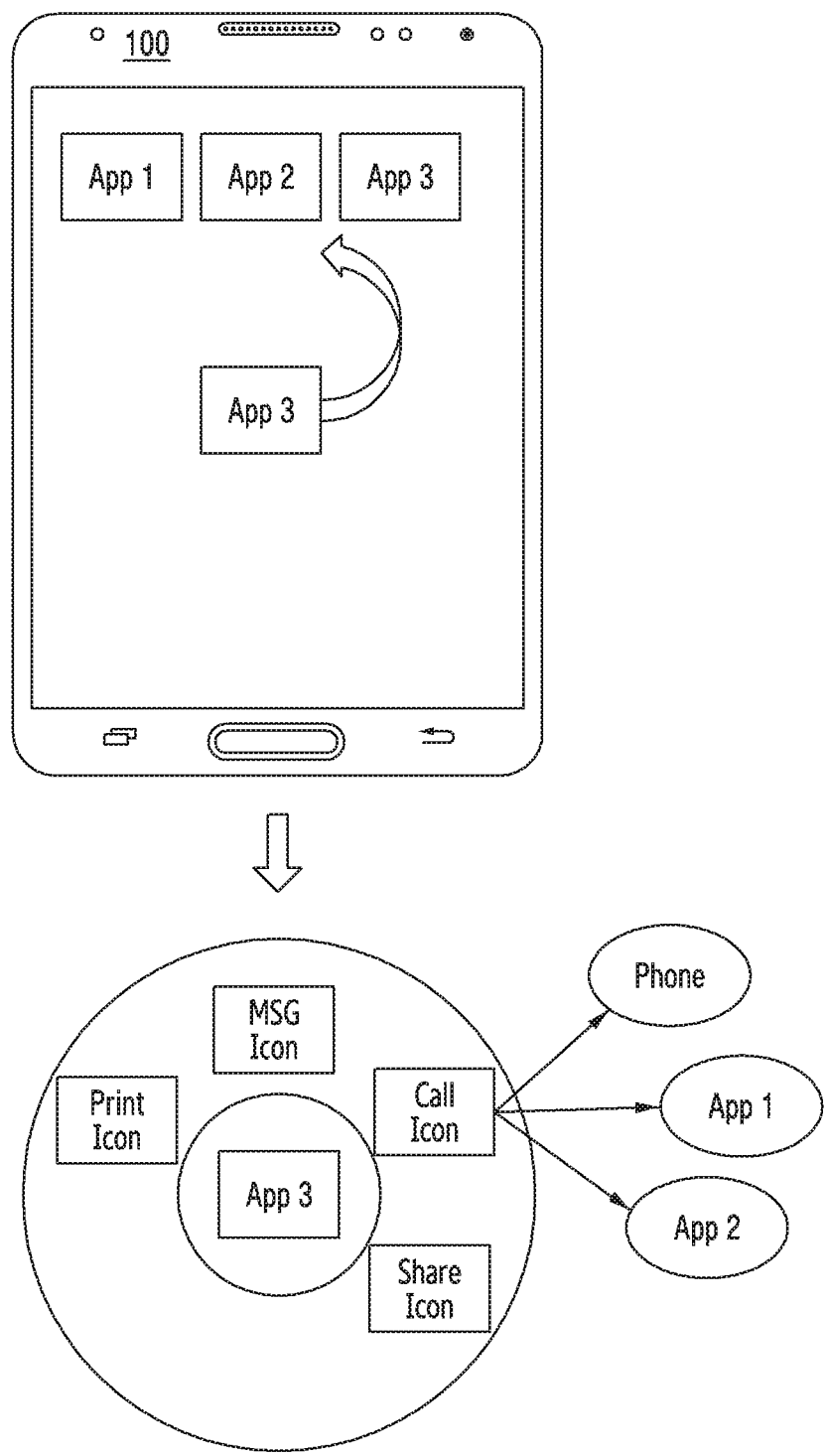
FIG. 10 is an example illustration in which an electronic device displays one or more actions based on an identified context, according to an embodiment of the disclosure.

FIG. 10 is an example illustration in which an electronic device displays one or more actions based on an identified context, according to an embodiment of the disclosure.

Referring to FIG. 10, a user drags an icon (i.e., App 3 icon) and drops it on itself. When the App 3 is dragged and dropped on itself, the electronic device 100 displays all actions that can be performed on the App 3 based on its current context. For example, if App 3 is a professional networking application, then the current context of the professional networking application includes a current/recent viewed profile. The current context of the professional networking application may include a profile Uniform Resource Locator (URL), a phone number of the profile and an email identification (ID) of the profile. The various actions recommended by the electronic device 100 includes calling the current/latest viewed profile, messaging the current/latest viewed profile, emailing to the current/latest viewed profile and sharing the current/latest viewed profile as shown in the inner ring. Upon receiving a selection of an action (i.e., a calling action), the electronic device 100 provides possible methods such as calling through a phone application or calling through a communication application as shown in the outer ring.

Figure 11:
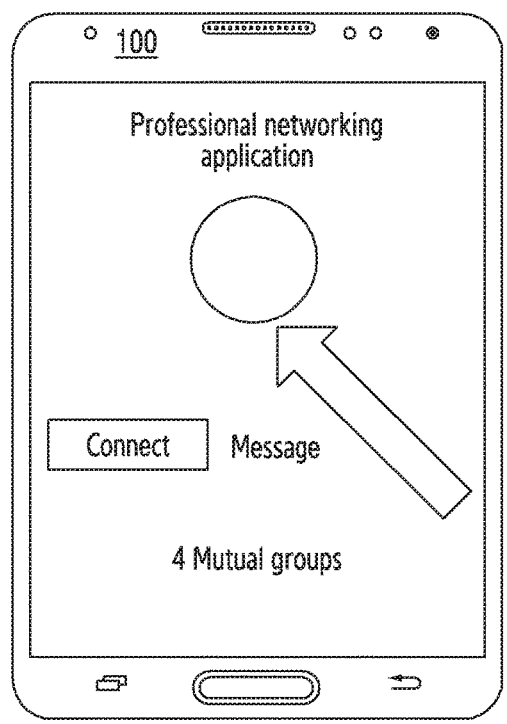
FIG. 11 is an example illustration in which an electronic device displays one or more actions when a drag gesture is performed on an application being accessed at the electronic device, according to an embodiment of the disclosure.
Figure 11:
Figure 11:
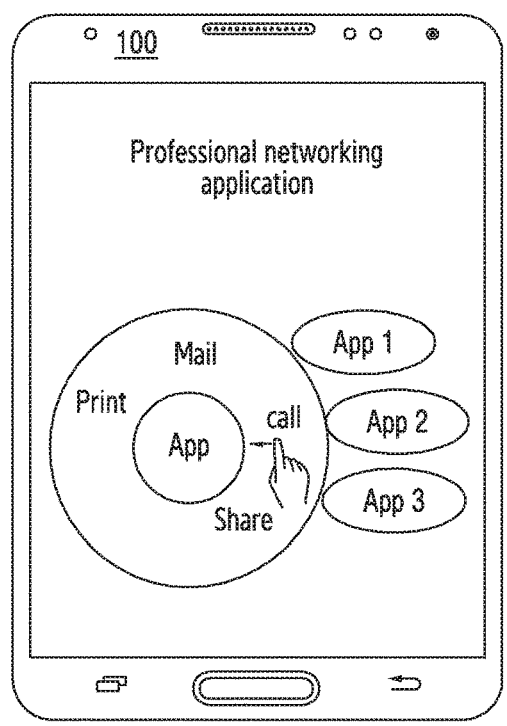

FIG. 11 is an example illustration in which an electronic device displays one or more actions when a drag gesture is performed on an application being accessed at the electronic device, according to an embodiment of the disclosure.

Referring to FIG. 11, a user is accessing a professional networking application. The user performs a drag gesture on the professional networking application. The drag gesture can be performed on any portion of the page in the professional networking application. When the drag gesture is performed, the electronic device 100 displays all actions that can be performed on the App 3 based on its current context. Upon receiving a selection of an action (i.e., a calling action), the electronic device 100 provides possible methods as described in the FIG. 10. Thus, with the proposed method, the drag gesture is performed for content sharing without closing the application.

Figure 12:
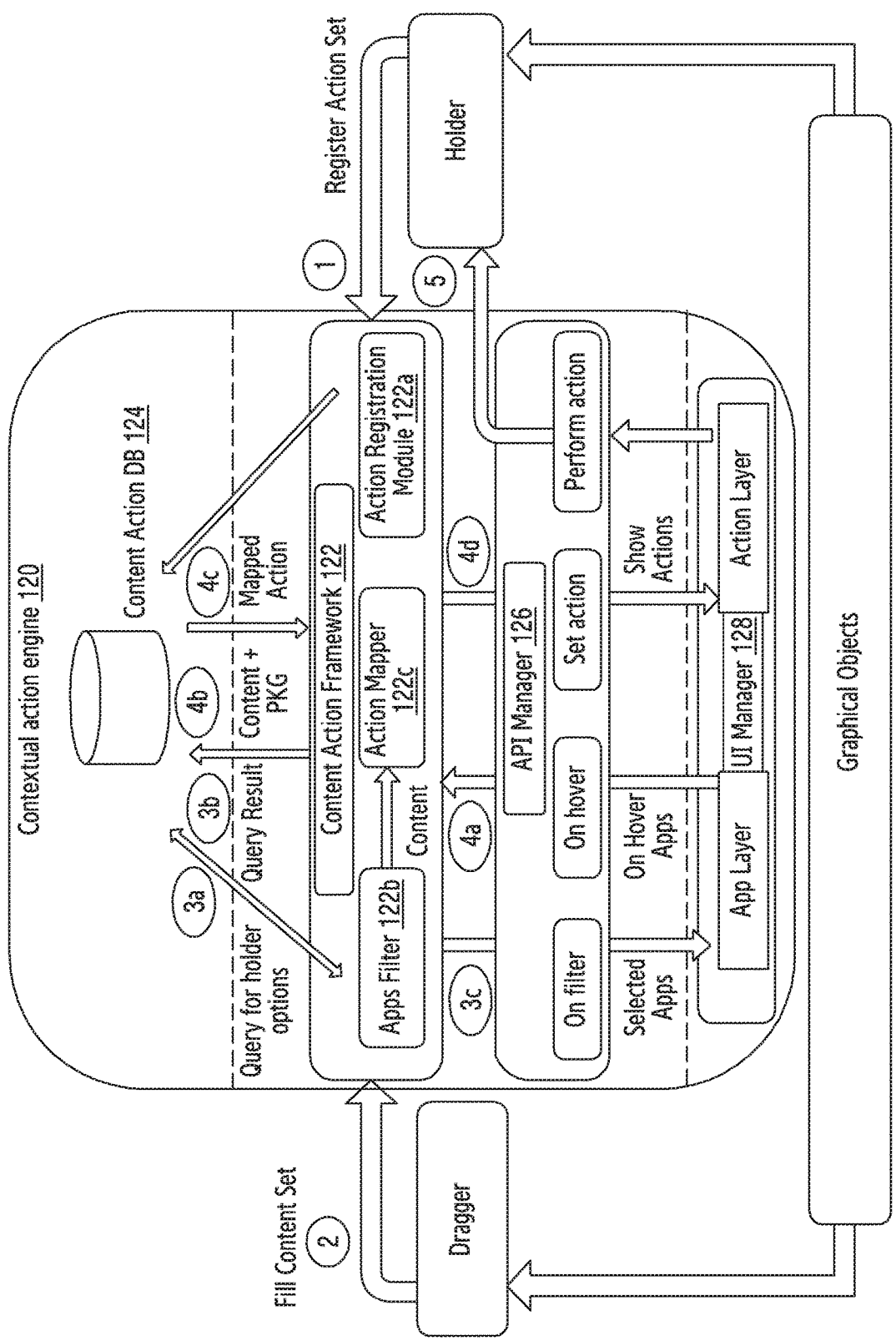
FIG. 12 is a block diagram of a contextual action engine in an electronic device, according to an embodiment of the disclosure.

FIG. 12 is a block diagram of a contextual action engine in an electronic device, according to an embodiment of the disclosure.

Referring to FIG. 12, the contextual action engine 120 includes a content action framework 122, a content action database (DB) 124, an API manager 126 and a User Interface (UI) manager 128. The content action framework 122 includes an action registration module 122a, Apps filter 122b and an action mapper 122c.

The content action framework 122 provides an API to log an application's context which is be used by all the applications. As depicted in the FIG. 12, a dragger is a GUI element which is dragged to perform context-based actions. A holder is another GUI element on which the dragger is dropped to finish the context-based drag-and-drop operation. The action registration module 122a is used by different applications to register supporting actions for a specific content. The Apps filter 122b is used for filtering apps which provide actions for specific input content type. The action mapper 122c is used for fetching actions corresponding to given package name and content type. The content action database 124 is used to map the Content-Action and Action-Package Names. The content action database 124 also maintains a record of current context of every application. When the user performs a drag on an application icon, the content action framework 122 will perform a lookup into the content action database 124 to determine the context of the application. Similarly, the context of the holder can be determined. In some embodiments, the content action database 124 may reside in a cloud network. The content action database 124 maintains a record of current context of every application as shown in Table 1.

TABLE 1

| ID | Package | Content type | Content |
|---|---|---|---|
| 1 | Com.gallary | URI_IMAGE | /sdcard/DCIM/2018070612.jpg |
| 2 | Com.phone | Contact number | 9560604464 |
| 3 | Com.maps | Location | 28.6208° N, 77.3639° E |
| 4 | Com.App 1 | Profile | Er.ankursharma89@gmail.com |
| 5 | Com.App2 | Profile | 8826243497 |

The API manager 126 contains a set of APIs for providing interaction between Control and View layers. The set of APIs can include OnFilter( ), OnHover( ), SetAction ( ) and PerformAction( ) or the like. The UI manager 128 includes an application layer and an action layer. The application layer is used to display filtered app icons for specific content type and the action layer is used to display a supporting set of actions provided by a package for a specific content type.

Figure 13:
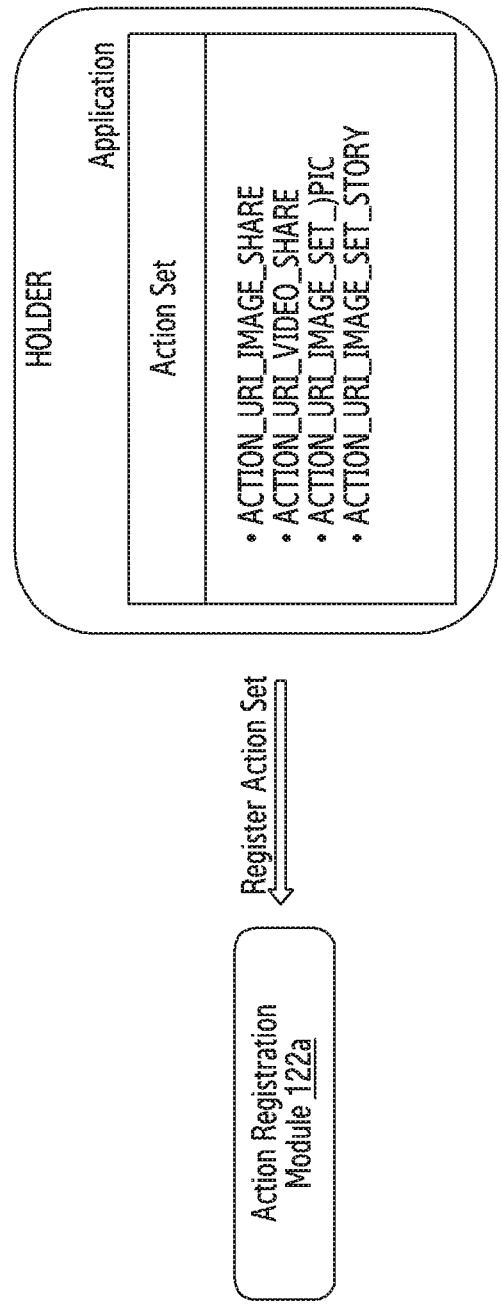
FIG. 13 illustrates registration of actions of an application based on content type, according to an embodiment of the disclosure.

FIG. 13 illustrates registration of actions of an application based on content type, according to an embodiment of the disclosure.

Referring to FIGS. 12 and 13, at operation 1, the holder registers its content-based action set with the action registration module 122a. With the registration, the holder indicates the contextual action engine 120 about the actions it supports with respect to the content. For example, in case of a content sharing application, the content type of the application can be an image or a video, and the action can be sharing or setting a profile picture or the like.

Figure 14:
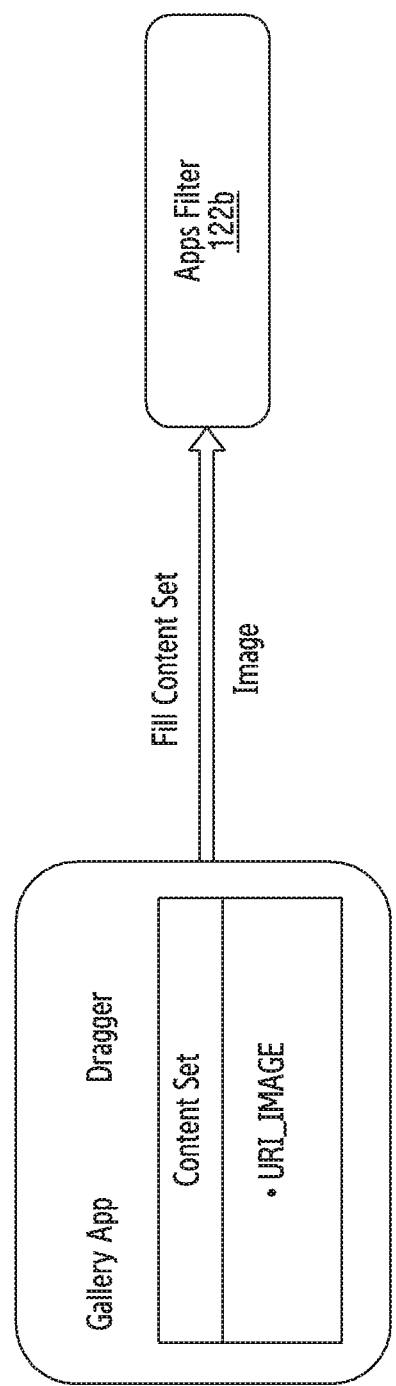
FIG. 14 illustrates transfer of content of an application based on a context of the application, according to an embodiment of the disclosure.

FIG. 14 illustrates transfer of content of an application based on a context of the application, according to an embodiment of the disclosure.

Referring to FIGS. 12 and 13, at operation 2, the dragger fills its content and passes it to the Apps Filter 122b. The content is transferred based on the current context of the dragger. For a given scenario, the content set of gallery will contain the image URI of recently/currently opened image. Further, the content types can include a phone number, an image, video, a file, a location, email contact, a settings object or the like.

Figure 15:
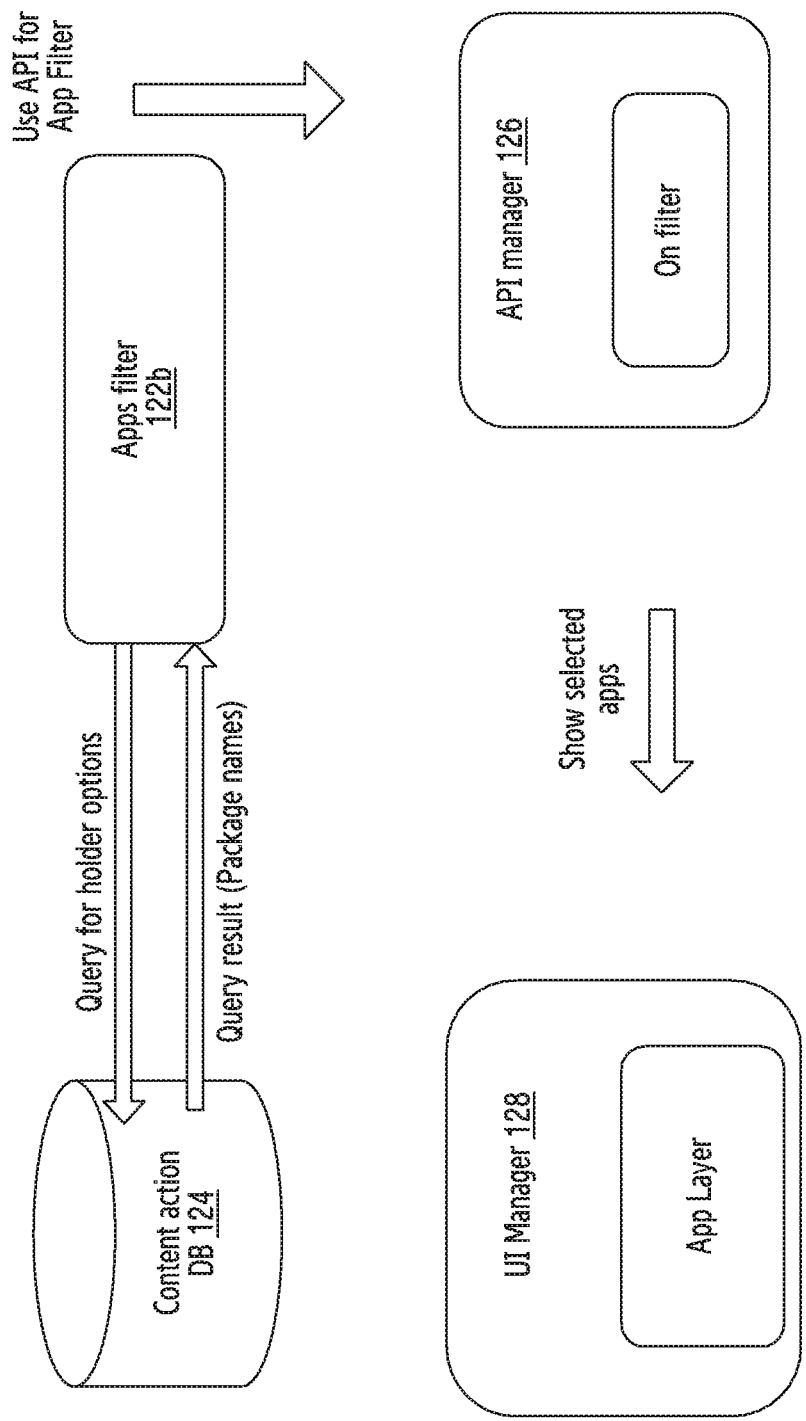
FIG. 15 illustrates various operations for determining one or more relevant applications for performing the one or more actions, according to an embodiment of the disclosure.

FIG. 15 illustrates various operations for determining one or more relevant applications for performing the one or more actions, according to an embodiment of the disclosure.

Referring to FIGS. 12 and 15, at operation 3a, Apps Filter 122b queries the content action DB 124 for potential apps/icons based on the current dragger content. At operation 3b, the content action DB 124 DB checks the apps/icons which have registered actions corresponding to the input Content Set. Only the package names of such apps/icons are provided to Apps Filter 122b. At operation 3c, the Apps Filter 122b passes filtered package names to UI Manager's App Layer, using an API invocation i.e., OnFilter( ).

Figure 16:
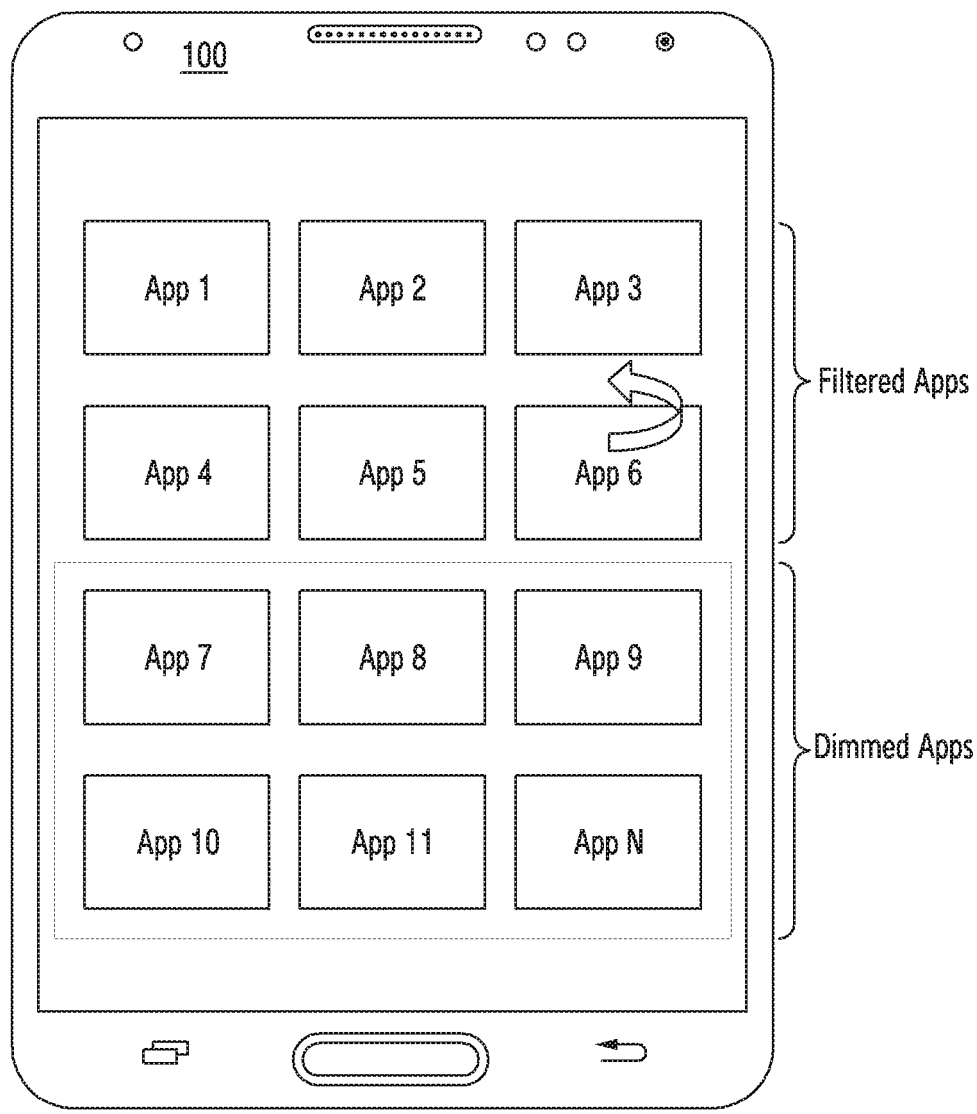
FIG. 16 is an example illustration in which an electronic device displays a plurality of applications related to a selected application for performing one or more actions, according to an embodiment of the disclosure.

FIG. 16 is an example illustration in which an electronic device displays a plurality of applications related to a selected application for performing one or more actions, according to an embodiment of the disclosure.

Referring to FIGS. 12 and 16, the UI Manager 128 displays the icons for received package names as highlighted. All other icons on launcher are dimmed.

Figure 17:
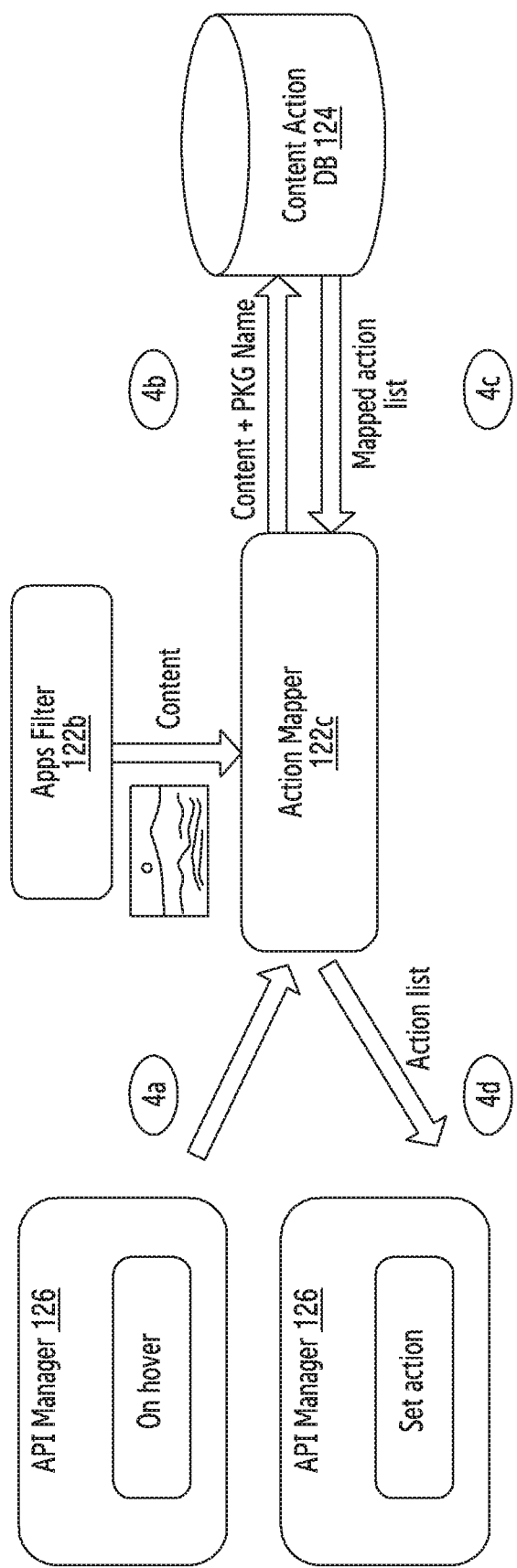
FIG. 17 illustrates various operations performed when an application icon is dragged toward a vicinity of another application icon, according to an embodiment of the disclosure.

FIG. 17 illustrates various operations performed when an application icon is dragged toward a vicinity of another application icon, according to an embodiment of the disclosure.

Referring to FIGS. 12 and 17, at operation 4a, when the dragged icon comes in vicinity of any of the highlighted icons, then the App layer calls the onHover( ) API. This API transfers the package name of the closest app/icon to the Action Mapper 122c. At operation 4b, the Action Mapper 122c queries the content action DB 124 for Action List corresponding to the received package. At operation 4c, content action DB 124 responds with the list of actions that are mapped with the input package for the given content. At operation 4d, the Action list is provided to UI Manager Action Layer through SetAction( ) API.

Figure 18:
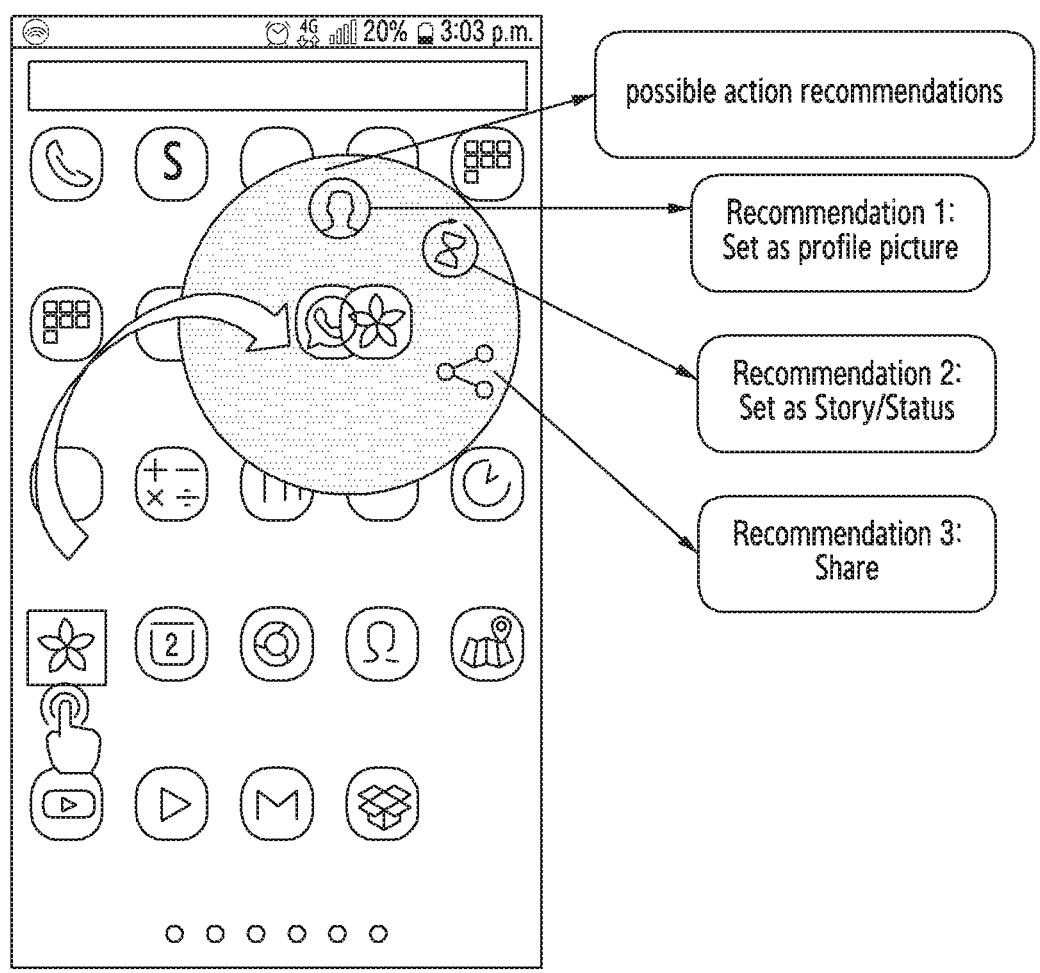
FIG. 18 is an example illustration in which an electronic device displays recommendations when an application icon is dragged and dropped over one or more application icons, according to an embodiment of the disclosure.

FIG. 18 is an example illustration in which an electronic device displays recommendations when an application icon is dragged and hovered over one or more application icons, according to an embodiment of the disclosure.

Referring to FIG. 18, when a Gallery icon comes in vicinity of a communication application highlighted icon on the screen then OnHover( ) API is invoked. The OnHover( ) API detects the holder package name as a communication application and sends it to the Action Mapper 122c. The Action Mapper 122c queries corresponding actions of the communication application from the content action DB 124. The actions set provided to UI manager 128 are displayed as action/recommended options to the user as shown in FIG. 18.

Referring again to FIG. 12, at operation 5, when the dragger is dropped on one of the action options from the operation 4, then the PerformAction( ) API is invoked. The selected action is performed on the Holder icon based on the holder's current context.

Figure 19:
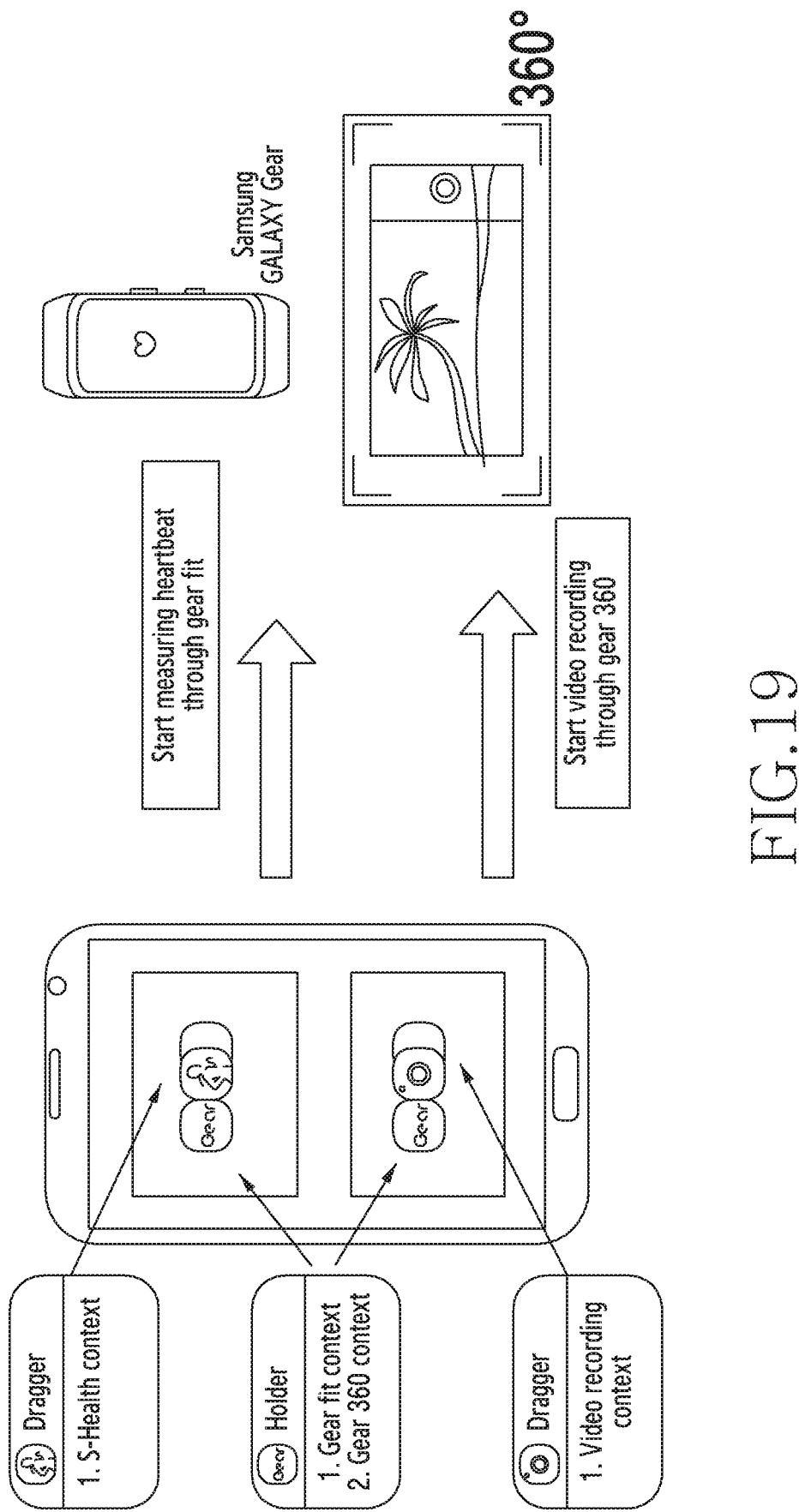
FIG. 19 is an example illustration in which various actions are performed on connected devices associated with the electronic device, according to an embodiment of the disclosure.

FIG. 19 is an example illustration in which various actions are performed on connected devices associated with an electronic device, according to an embodiment of the disclosure.

Referring to FIG. 19, a user can perform smart actions on a wearable device connected with the electronic device 100 without navigating through an application associated with the wearable device, and without interacting with the wearable device directly. Any other application can be selected as a dragger and selecting an application associated with the wearable device as a holder. The context of the dragger determines which wearable device is to be used to perform the action.

Figure 20A:
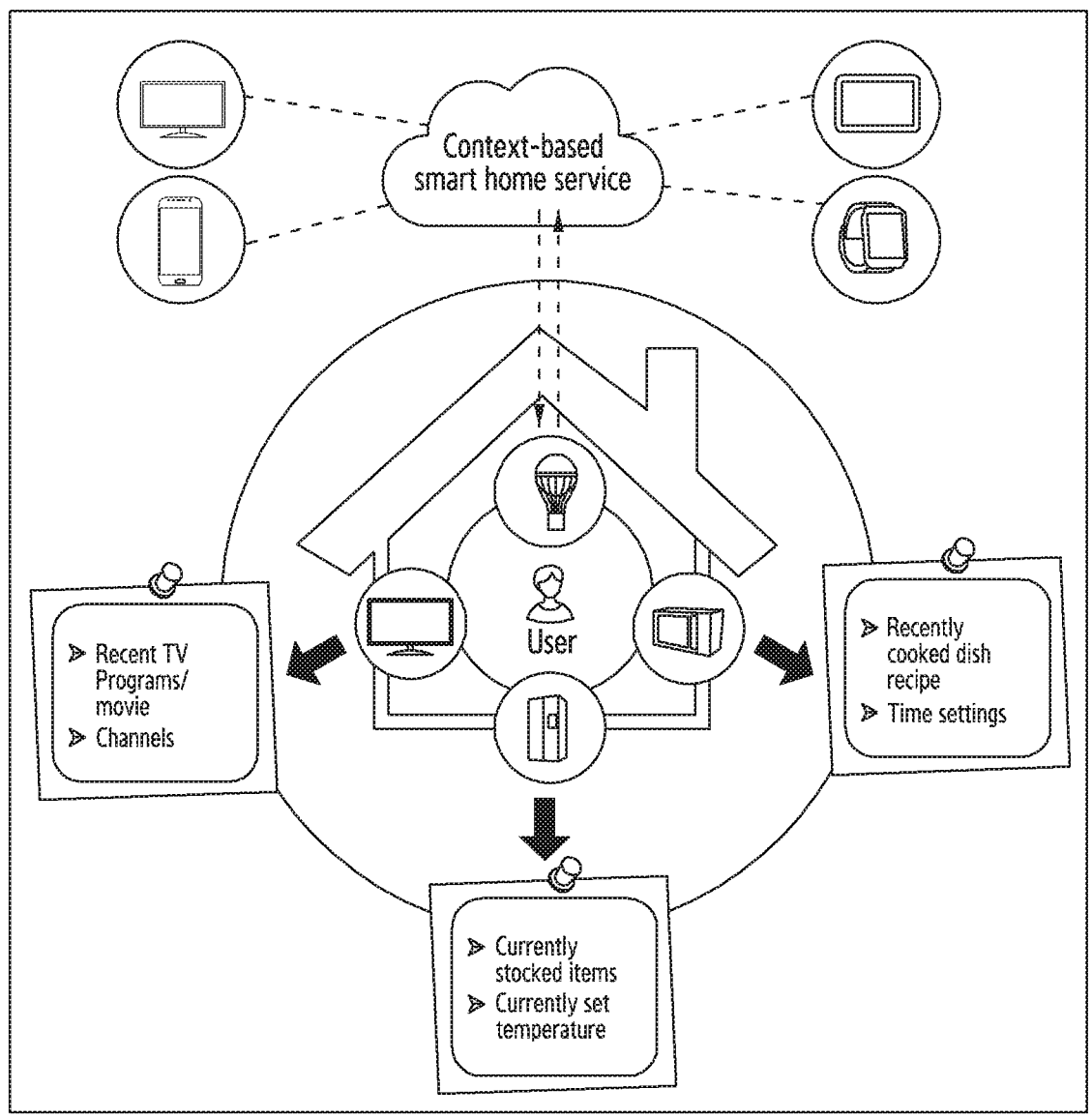
FIGS. 20A and 20B are example illustrations in which various actions are performed on IoT devices in a smart home environment, according to various embodiments of the disclosure.
Figure 20B:
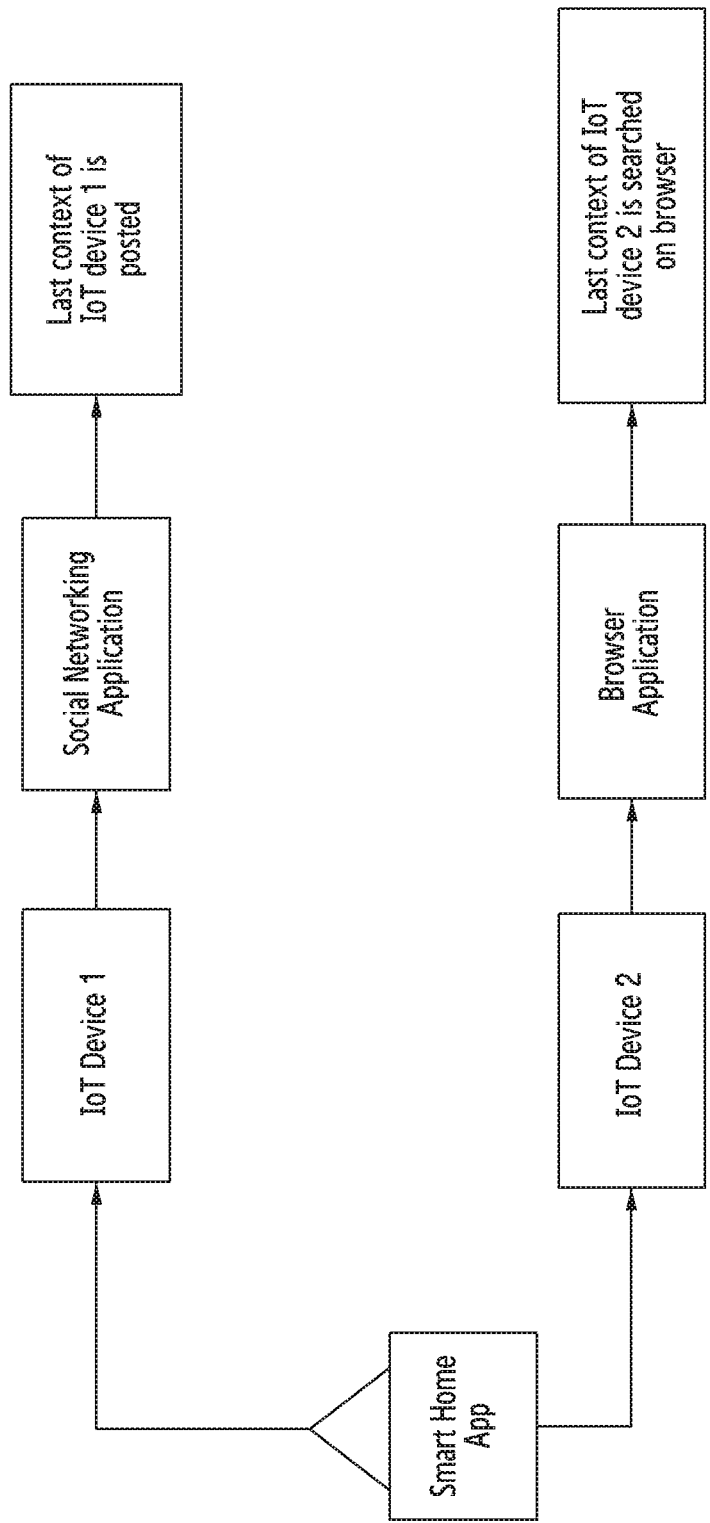

FIGS. 20A and 20B are example illustrations in which various actions are performed on IoT devices in a smart home environment, according to various embodiments of the disclosure.

Referring to FIG. 20A, the proposed method can be used for performing smart actions on IoT devices connected in a smart home. When a user drops an icon of a Smart Home Application on any other application, then the context of the current/last interacted IOT device can be utilized to perform further action(s).

Referring to FIG. 20B, for example, an IoT device 1 is a microwave oven and an IoT device 2 is a Television. The context of the microwave oven is a recently prepared dish and the context of the Television is the last viewed program. Thus, with the proposed method, when user drops the icon of the smart home application icon on any other application icon, then the context of the current/last interacted IoT device can be utilized to perform context-based actions.

Figure 21:
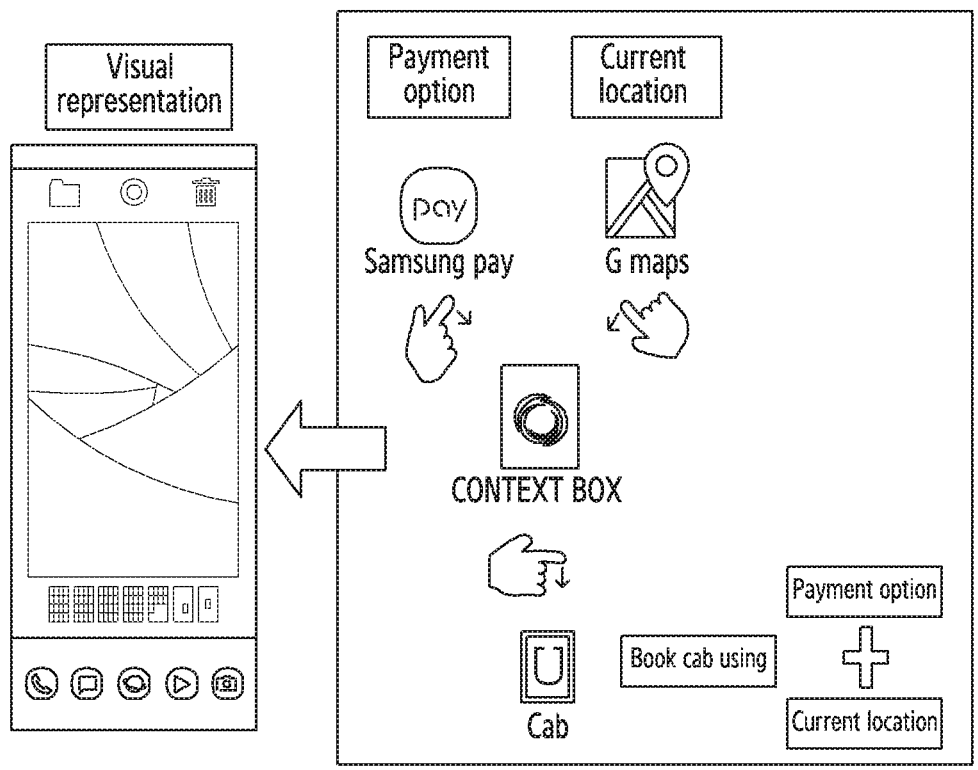
FIG. 21 is an example illustration in which actions are performed in an electronic device based on context of plurality applications, according to an embodiment of the disclosure.

FIG. 21 is an example illustration in which actions are performed in an electronic device based on context of plurality applications, according to an embodiment of the disclosure.

Referring to FIG. 21, with the proposed method, the context of multiple applications can be used (i.e., through context window or a context box, where multiple applications are added to the context window) to perform cumulative actions at the same time. The user can add the icons of more than one application in the context window and when the user drops the context window on the holder, then a single or multiple actions can be performed based on the respective contexts of dropped applications in the holder.

The embodiments disclosed herein can be implemented through at least one software program running on at least one hardware device and performing network management functions to control the elements. The elements shown include blocks which can be at least one of a hardware device, or a combination of hardware device and software modules.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A method for operating an electronic device, the method comprising:
   identifying that a touch input on a first graphical object among a plurality of graphical objects in a display of the electronic device is moved from the first graphical object to a second graphical object among the plurality of the graphical objects;
   based on identifying that the touch input on the first graphical object among the plurality of the graphical objects in the display of the electronic device is moved from the first graphical object to the second graphical object, identifying one or more contexts associated with each of the first graphical object and the second graphical object;
   based on the one or more identified contexts, displaying one or more third graphical objects of the one or more identified contexts;
   based on identifying that the touch input is moved to a fourth graphical object among of the one or more third graphical objects, displaying information of the fourth graphical object; and
   based on identifying a release of the touch input, performing one or more actions associated with the fourth graphical object in the electronic device,
   wherein the displaying of the one or more third graphical objects of the one or more identified contexts comprises displaying a plurality of recommended options to a user based on available actions associated with the second graphical object,
   wherein the available actions associated with the second graphical object are identified when the first graphical object is hovered over the second graphical object, and
   wherein the available actions associated with the second graphical object are identified by mapping a name associated with the second graphical object to a stored list of actions associated with the name.

2. The method of claim 1, wherein the identifying of the one or more contexts associated with each of the first graphical object and the second graphical object comprises extracting a recent activity of the user with the first graphical object and the second graphical object.

3. The method of claim 1, wherein the performing of the one or more actions associated with the fourth graphical object in the electronic device comprises sharing at least one content of the first graphical object with the second graphical object.

4. The method of claim 1,
   wherein the first graphical object comprises an application icon.

5. The method of claim 1,
   wherein the first graphical object comprises a notification panel icon.

6. The method of claim 1,
   wherein the first graphical object comprises a GUI element.

7. The method of claim 1, wherein the first graphical object comprises a first application.

* * * * *